(12) United States Patent
Asano et al.

(10) Patent No.: US 8,471,573 B2
(45) Date of Patent: Jun. 25, 2013

(54) DYNAMIC QUANTITY SENSOR AND MANUFACTURING METHOD THEREOF

(75) Inventors: Masaaki Asano, Tokyo (JP); Tsukasa Yonekawa, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 13/446,472

(22) Filed: Apr. 13, 2012

(65) Prior Publication Data

US 2012/0235694 A1    Sep. 20, 2012

Related U.S. Application Data

(63) Continuation of application No. PCT/JP2010/071722, filed on Dec. 3, 2010.

(30) Foreign Application Priority Data

Mar. 26, 2010   (JP) ................................. 2010-071318

(51) Int. Cl.
| | | |
|---|---|---|
| *G01R 31/08* | (2006.01) | |
| *G01R 27/08* | (2006.01) | |
| *H01G 7/00* | (2006.01) | |
| *G01N 11/00* | (2006.01) | |
| *G01N 13/00* | (2006.01) | |

(52) U.S. Cl.
USPC ........ 324/705; 324/525; 324/691; 361/283.1; 73/54.14; 73/64.49

(58) Field of Classification Search
USPC ............ 324/705, 71.4, 76.16, 347, 460, 464, 324/525, 691; 73/54.14, 64.49, 862.53, 514–515; 702/47, 138, 128; 361/283.1
See application file for complete search history.

(56) References Cited

U.S. PATENT DOCUMENTS 6,199,430 B1 *   3/2001   Kano et al. ................. 73/514.32

FOREIGN PATENT DOCUMENTS

| JP | 04-335160 A | 11/1992 |
|---|---|---|
| JP | 11-098868 A | 4/1999 |
| JP | 11-242052 A | 9/1999 |
| JP | 2007-303974 A | 11/2007 |

OTHER PUBLICATIONS

Suzuki, K. et al. MEMS Tilt Sensor Fabricated Utilizing Anodic Bonding of Thin Silicon Film on Glass Substrate. In: Journal of Electronics E, vol. 129, No. 10; 2009; pp. 328-332.
International Search Report for PCT/JP2010/071722; Dec. 28, 2010.

* cited by examiner

*Primary Examiner* — Melissa Koval
*Assistant Examiner* — Farhana Hoque
(74) *Attorney, Agent, or Firm* — Pearne & Gordon LLP

(57) ABSTRACT

A dynamic quantity sensor includes a first substrate, a fixed part arranged in the first substrate, a spiral shaped movable electrode arranged separated from the first substrate, one end of the spiral shaped movable electrode being supported by the fixed part, a fixed electrode positioned on the periphery of the movable electrode and arranged in a detection direction of a dynamic quantity, and a first terminal electrically connected to the fixed part and a second terminal electrically connected to the fixed electrode.

9 Claims, 23 Drawing Sheets

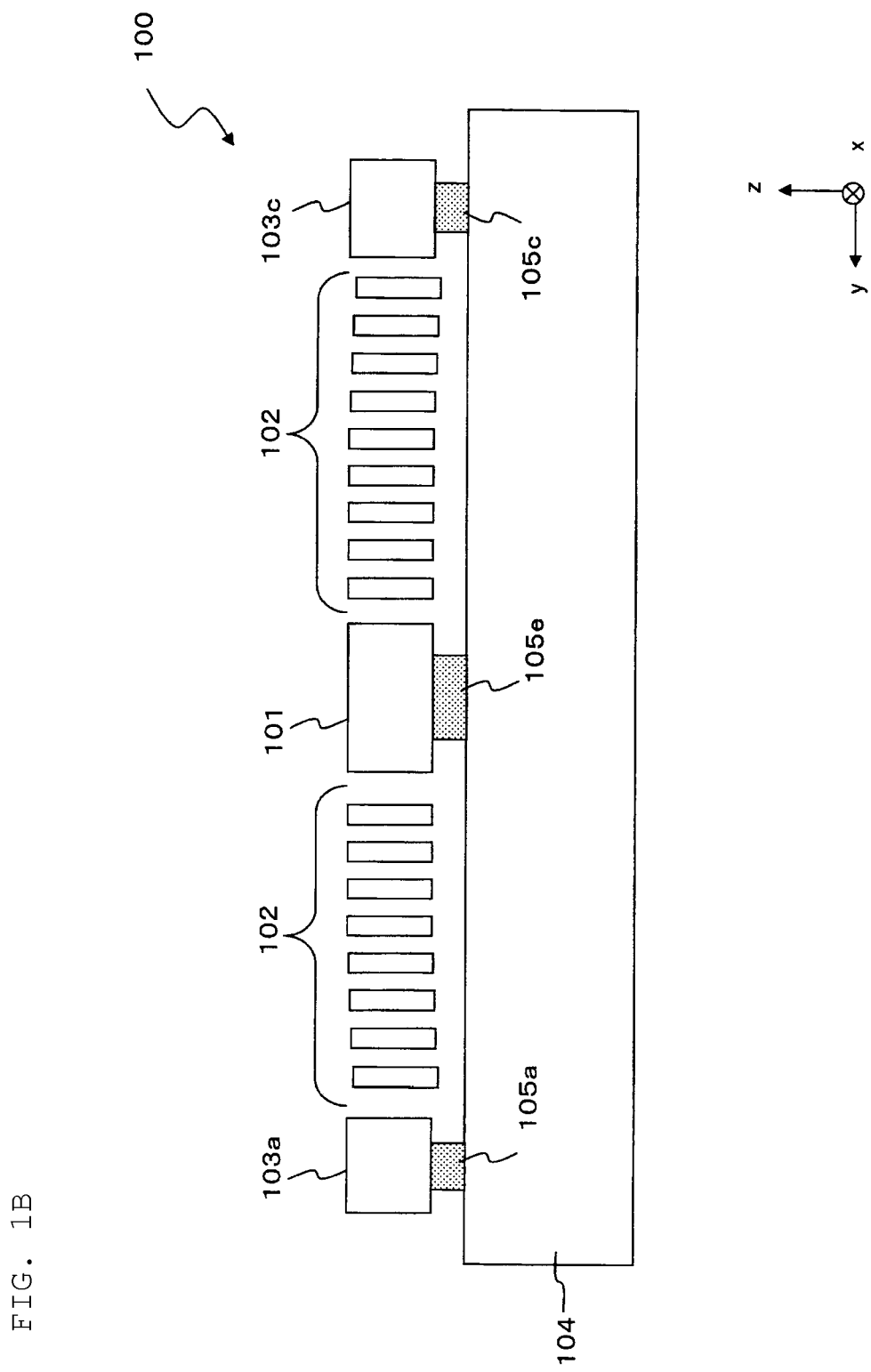

FIG. 2
(A)
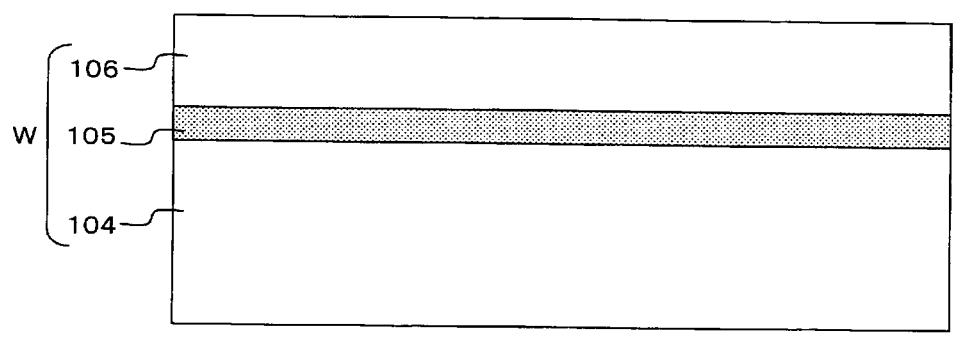
(B)
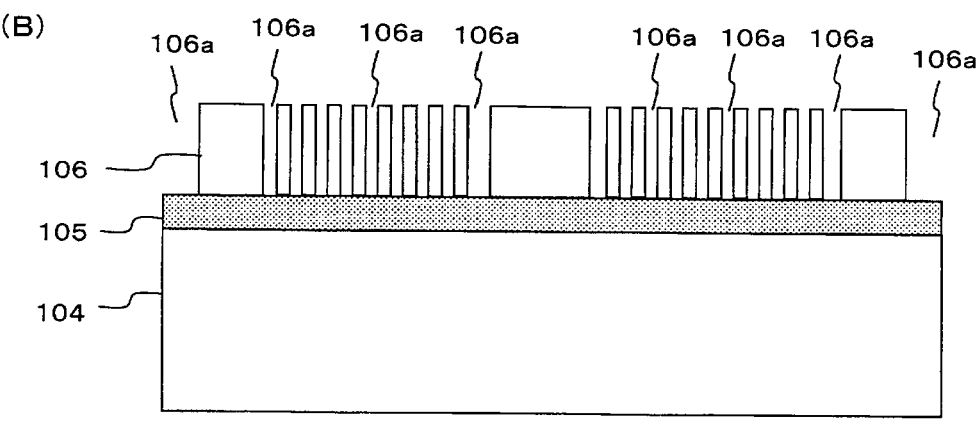
(C)
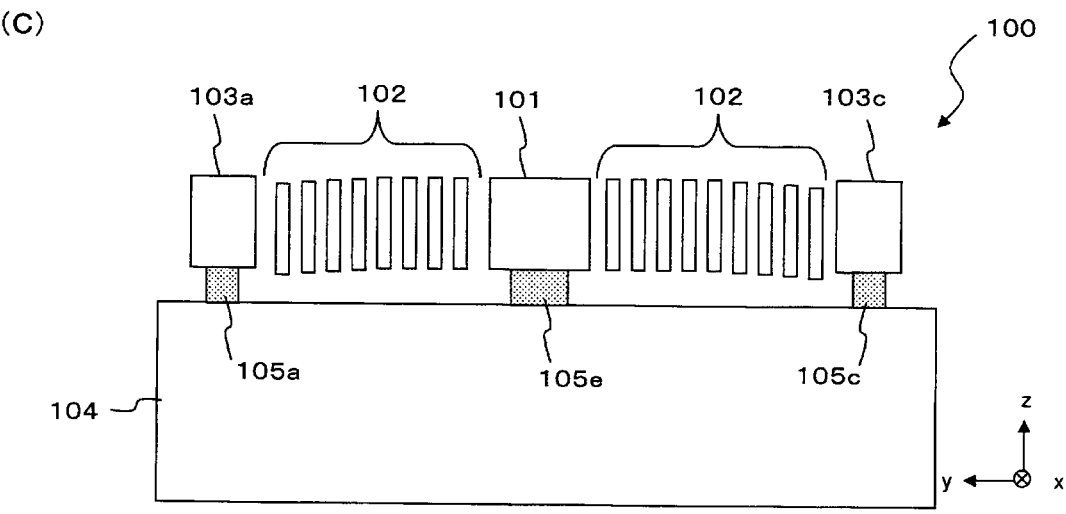

FIG. 3
(a) F = F1
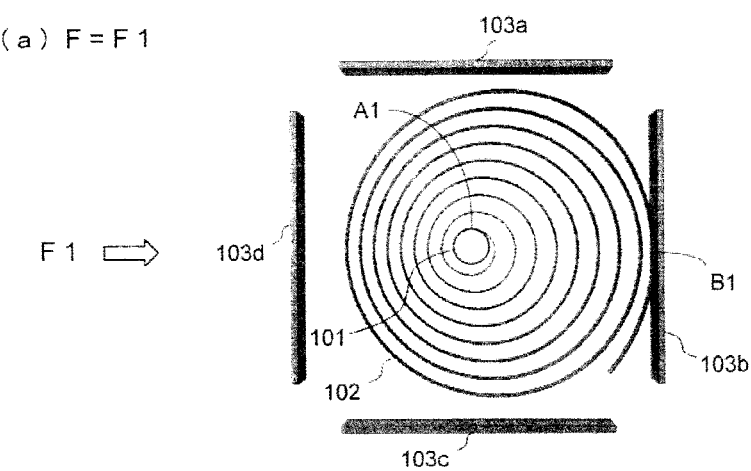
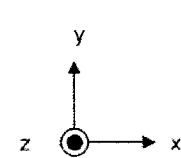
(b) F = F2
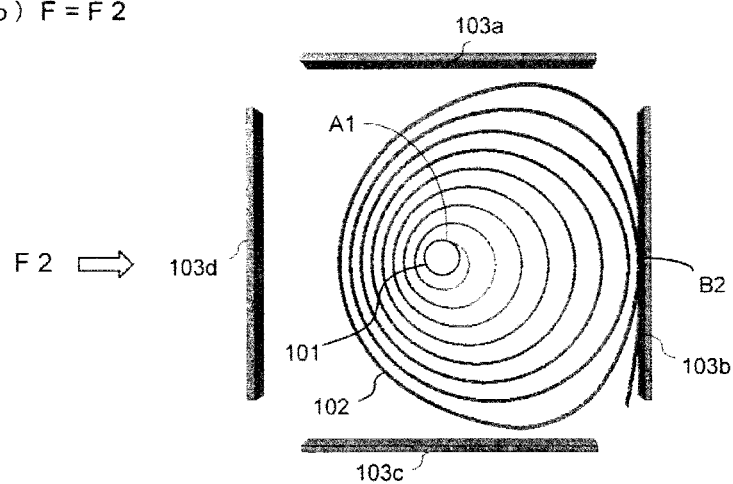
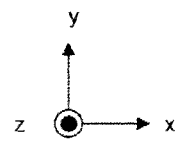
(c) F = F3
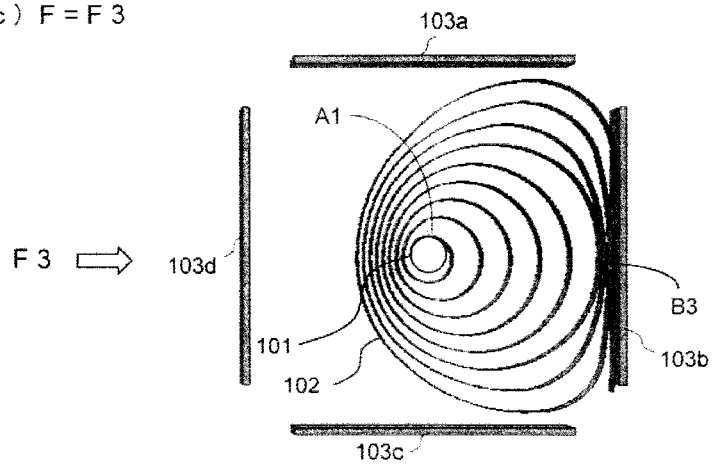
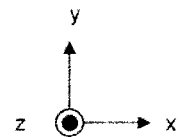

FIG. 4
(a) F = F1
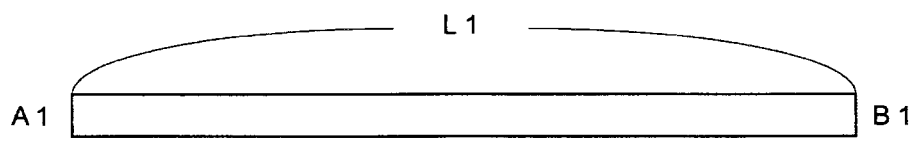
(b) F = F2
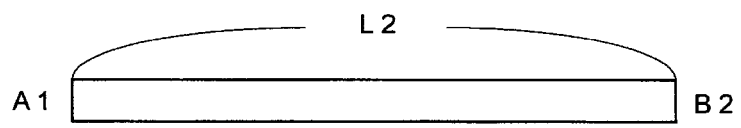
(c) F = F3
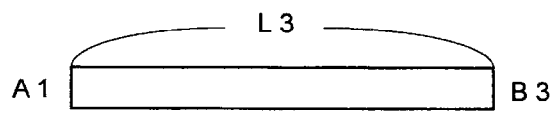

FIG. 15
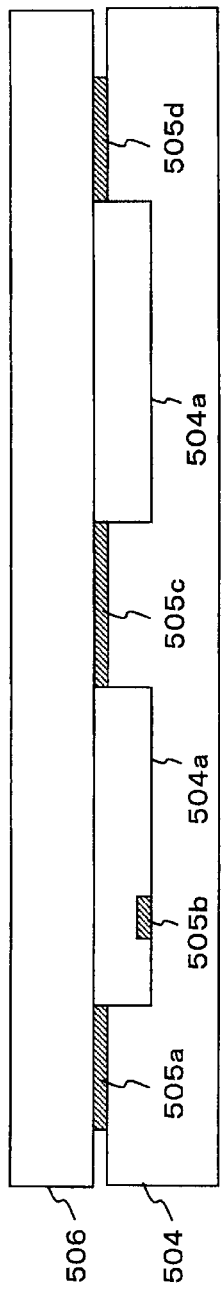
(A)
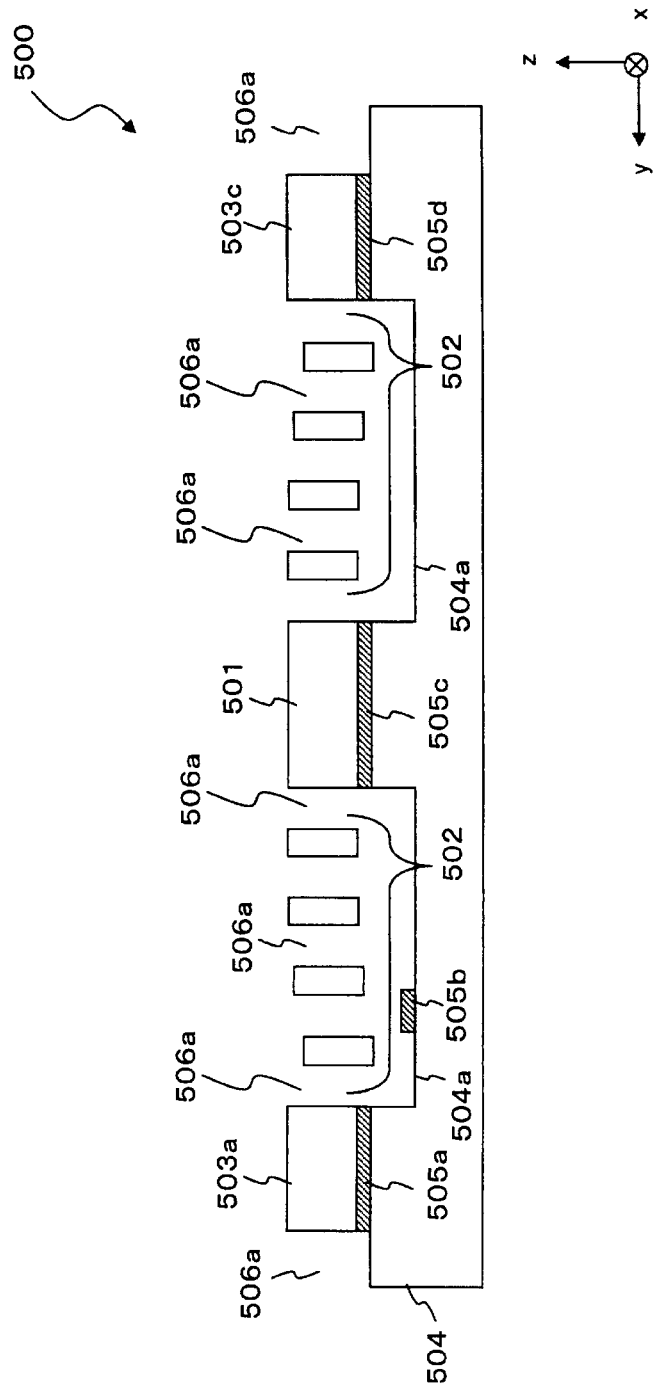
(B)

DYNAMIC QUANTITY SENSOR AND MANUFACTURING METHOD THEREOF

CROSS REFERENCE TO RELATED APPLICATION

This application is based upon and claims the benefit of priority from the prior Japanese Patent Application No. 2010-071318, filed on 26 Mar., 2010, the entire contents of which are incorporated herein by reference.

FIELD

The present invention is related to a dynamic quantity sensor which detects dynamic quantity using an element in which a resistance value changes according to an external force, and a manufacturing method of the dynamic quantity sensor.

BACKGROUND

In recent years, small scale and light electronic devices with multi-functionality and high functionality are becoming widespread and a greater level of integration of installed electronic components is being demanded. In response to such demands, the number of each type of electronic component being manufactured as a semiconductor device is increasing. Consequently, small scale and light electronic devices such as a sensor etc. for detecting dynamic quantity are being manufactured using semiconductor devices apart from semiconductor devices manufactured as circuit components. For example, a moving part which displaces according an external force is formed on a semiconductor substrate and a sensor which detects the displacement of this moving part using a piezo resistor element or capacitance sensor element is realized in an acceleration sensor having a small scale and simple structure using MEMS (Micro Electro Mechanical Systems) technology.

In addition, conventionally, a sensor which detects vibration according to the presence of a contact between a movable electrode and a fixed electrode formed on a semiconductor substrate is known as a contact type semiconductor sensor (for example, refer to patent document 1). Alternatively, a sensor is known in which a ring shaped movable electrode is formed on an exterior spiral part of a structure in which the movable electrode is wound a plurality of times in a spiral shape around a fixed part on the semiconductor substrate, and which detects tilt by the presence of a contact between the movable electrode and a fixed electrode which is arranged on the spiral of the movable electrode (for example refer to non patent document 1).
Patent Document 1: Japanese Laid Open Patent 2007-303974
Non Patent Document 1: Yasushiro Nishioka, and 5 others, "MEMS Tilt Sensor Fabricated Utilizing Anodic Bonding of Thin Silicon Film on Glass Substrate" Journal of Electronics E, Volume 129, No. 10, 2009, p. 328-332.

However, a contact type semiconductor sensor proposed by the patent document 1 and non patent document 1 stated above cannot detect the presence of a contact between a movable electrode and a fixed electrode, and because an output level of an electrical signal generated when the movable electrode and fixed electrode contact is small, an amplification circuit etc. for amplifying this electrical signal was required to be arranged on the exterior of the sensor. In addition, the direction of the external force detected is also limited.

Furthermore, the manufacturing processes in a sensor which detects dynamic quantity using a conventional piezo resistor element or a capacitance type semiconductor sensor are complex and manufacturing costs increase.

The present invention attempts to solve the above problems by providing a dynamic quantity sensor and manufacturing method thereof which can detect the magnitude, direction and acceleration of an external force and which can be manufactured at low cost.

SUMMARY

The dynamic quantity sensor related to an embodiment of the present invention includes a first substrate, a fixed part arranged in the first substrate, a spiral shaped movable electrode arranged separated from the first substrate, one end of the spiral shaped movable electrode being supported by the fixed part, a fixed electrode positioned on the periphery of the movable electrode and arranged in a detection direction of a dynamic quantity, and a first terminal electrically connected to the fixed part and a second terminal electrically connected to the fixed electrode. The dynamic quantity sensor related to an embodiment of the present invention can detect the magnitude, direction and acceleration of an applied external force. Furthermore, the dynamic quantity sensor related to an embodiment of the present invention has a simple structure compared to a conventional sensor, therefore, it is possible to realize a dynamic quantity sensor which is easy to manufacture.

In the dynamic quantity sensor related to an embodiment of the present invention, the movable electrode may change shape according to an applied external force and contact one part of the fixed electrode, and a magnitude of the external force may be detected based on a change in an electrical resistance value between the fixed part and the fixed electrode when the movable electrode contacts the fixed electrode. Because the dynamic quantity sensor related to an embodiment of the present invention can detect a change in an external force as a change in the level of resistance, it is possible to increase a detection signal level compared to a conventional dynamic quantity sensor. As a result, an amplifier circuit is not required and it is possible to reduce manufacturing costs.

In the dynamic quantity sensor related to an embodiment of the present invention, the movable electrode may be arranged with a projection part on a side surface of an outermost spiral. Because it is easy for the movable electrode to contact with the fixed electrodes when an external force is applied due to the weight of an outer spiral side of the movable electrode, the dynamic quantity sensor related to an embodiment of the present invention can detect an external force as a change in the level of resistance even in the case where the applied external force is small and the detection sensitivity of an external force can be improved.

In the dynamic quantity sensor related to an embodiment of the present invention, a width of the movable electrode may gradually increase the greater the distance from the fixed part. Because it is easy for the movable electrode to contact with the fixed electrodes when an external force is applied due to the weight of an outer spiral side of the movable electrode, the dynamic quantity sensor related to an embodiment of the present invention can detect an external force as a change in the level of resistance even in the case where the applied external force is small and the detection sensitivity of an external force can be improved.

In the dynamic quantity sensor related to an embodiment of the present invention, the width of one part of the movable electrode may be greatest towards the center from the outermost spiral. Because it is easy for the movable electrode to contact with the fixed electrodes when an external force is applied due to the weight of an outer spiral side of the movable electrode, the dynamic quantity sensor related to an embodiment of the present invention can detect an external force as a change in the level of resistance even in the case where the applied external force is small and the detection sensitivity of an external force can be improved.

In the dynamic quantity sensor related to an embodiment of the present invention, the movable electrode may include a first movable electrode, a second movable electrode and a ring shaped movable electrode, an end part of the outermost spiral of the first movable electrode is connected to an inner spiral surface of the ring shaped movable electrode, the ring shaped movable electrode is arranged separated from the first substrate on the periphery of the outermost spiral of the first movable electrode, an end part of the innermost spiral of the second movable electrode is connected to an outer periphery surface of the ring shaped movable electrode, the second movable electrode is arranged in a spiral shape separated from the first substrate on an outer periphery of the ring shaped movable electrode, and the width of the ring shaped movable electrode is wider than each width of the first movable electrode and the second movable electrode. Because it is easy for the second movable electrode to contact with the fixed electrodes when an external force is applied due to the weight of the ring shaped movable electrode, the dynamic quantity sensor related to an embodiment of the present invention can detect an external force as a change in the level of resistance even in the case where the applied external force is small and the detection sensitivity of an external force can be improved.

In the dynamic quantity sensor related to an embodiment of the present invention, an interval between spirals of the movable electrode may gradually become narrower the greater the distance from the fixed part. Because it is easy for the movable electrode to contact with the fixed electrodes when an external force is applied due to the weight of an outer spiral side of the movable electrode, the dynamic quantity sensor related to an embodiment of the present invention can detect an external force as a change in the level of resistance even in the case where the applied external force is small and the detection sensitivity of an external force can be improved.

In the dynamic quantity sensor related to an embodiment of the present invention, the fixed electrode may be arranged in a perpendicular direction or parallel direction with respect to the first substrate and facing the movable electrode. The dynamic quantity sensor related to an embodiment of the present invention can detect the size magnitude, direction and acceleration of a triaxial (X direction, Y direction, Z direction) external force.

The dynamic quantity sensor related to an embodiment of the present invention may further include a second substrate arranged on the fixed part and the fixed electrode, wherein the second substrate is arranged matching a position of the fixed part and the fixed electrode, and includes an electrode or wire which is electrically connected to the first terminal or second terminal. The dynamic quantity sensor related to an embodiment of the present invention has a simple structure compared to a conventional dynamic quantity sensor. Therefore, the number of manufacturing processes and manufacturing costs can be reduced.

In the dynamic quantity sensor related to an embodiment of the present invention, the fixed electrode may be arranged at a fixed distance from the fixed part. The dynamic quantity sensor related to an embodiment of the present invention can reduce a difference in a resistance level due to a difference in contact positions when the movable electrode contacts with the fixed electrode.

A manufacturing method of a dynamic quantity sensor related to an embodiment of the present invention may include etching an upper layer and a center layer of a first substrate formed from 3 layers to form a fixed part, a spiral shaped movable electrode separated from the first substrate, one end of the spiral shaped movable electrode being supported by the fixed part, and a fixed electrode arranged on a periphery of the movable electrode, forming an electrode or wire matching a formation position of the fixed part and fixed electrode on a second substrate, and bonding a surface of the first substrate formed with the fixed part, the movable electrode and the fixed electrode, with a surface of the second substrate formed with the electrode or the wire. Because the dynamic quantity sensor has a simple structure compared to a conventional dynamic quantity sensor using the manufacturing method of a dynamic quantity sensor related to an embodiment of the present invention, it is possible to reduce the number of manufacturing processes and manufacturing costs.

A manufacturing method of a dynamic quantity sensor related to an embodiment of the present invention may include forming a concave part on a glass substrate by etching, forming an electrode or wire on a surface of the glass substrate formed with the concave part, bonding a semiconductor substrate to a surface of the glass substrate formed with the electrode or wire, etching a surface of the semiconductor substrate not bonded with the glass substrate to form a fixed part, a spiral shaped movable electrode separated from the glass substrate, one end of the movable electrode being supported by the fixed part, and a fixed electrode arranged on a periphery of the movable electrode. Because the dynamic quantity sensor has a simple structure compared to a conventional dynamic quantity sensor using the manufacturing method of a dynamic quantity sensor related to an embodiment of the present invention, it is possible to reduce the number of manufacturing processes and manufacturing costs.

According to the present invention, it is possible to provide a dynamic quantity sensor and manufacturing method thereof in which it is possible to detect a magnitude of an external force by forming a movable electrode and fixed electrode so that a level of resistance changes according to the magnitude of the external force, detect the direction of the external force based on a contact position between the fixed electrode and movable electrode which is transformed by the external force, and manufacture the dynamic quantity sensor at low cost.

BRIEF DESCRIPTION OF DRAWINGS

FIG. 1B is a cross sectional diagram of the dynamic quantity sensor shown in FIG. 1A seen from the line A-A';

FIG. 2 is a diagram for explaining a manufacturing process of a dynamic quantity sensor related to the first embodiment of the present invention and (A) is a cross sectional diagram which shows a semiconductor substrate before processing, (B) is a cross sectional diagram which shows a process for forming a concave part in a semiconductor substrate, and (C) is a cross sectional diagram which shows a process for forming a fixed part, a movable electrode and a fixed electrode on a semiconductor substrate;

FIG. 3 is a diagram for explaining the operations of a dynamic quantity sensor related to the first embodiment of the present invention and (a) is a diagram which shows a state in which a movable electrode contacts a fixed electrode when an external force F1 is applied, (b) is a diagram which shows a state in which a movable electrode contacts a fixed electrode when an external force F2 is applied, and (c) is a diagram which shows a state in which a movable electrode contacts a fixed electrode when an external force F3 is applied;

FIG. 4 is a diagram which exemplary shows a change in length of a movable electrode corresponding to each operation state shown in FIG. 3 and (a) exemplary shows the length of a movable electrode corresponding to the operation state shown in FIG. 3 (a), (b) exemplary shows the length of a movable electrode corresponding to the operation state shown in FIGS. 3 (b), and (c) exemplary shows the length of a movable electrode corresponding to the operation state shown in FIG. 3 (c);

FIG. 15 is a diagram for explaining a manufacturing process of a dynamic quantity sensor related to the fifth embodiment of the present invention and (A) is a cross sectional diagram which shows a process for bonding a semiconductor substrate to a glass substrate formed with a terminal for a wire and (B) is a cross sectional diagram which shows a process for forming a fixed part, a movable electrode and a fixed electrode on a semiconductor substrate;

DESCRIPTION OF EMBODIMENTS

The preferred embodiments for realizing the present invention are explained below. Furthermore, the present invention is not limited to the embodiments explained below and various changes and modifications may be made without departing from the scope of the appended claims.

First Embodiment

Structure of a Dynamic Quantity Sensor

Figure 1A:
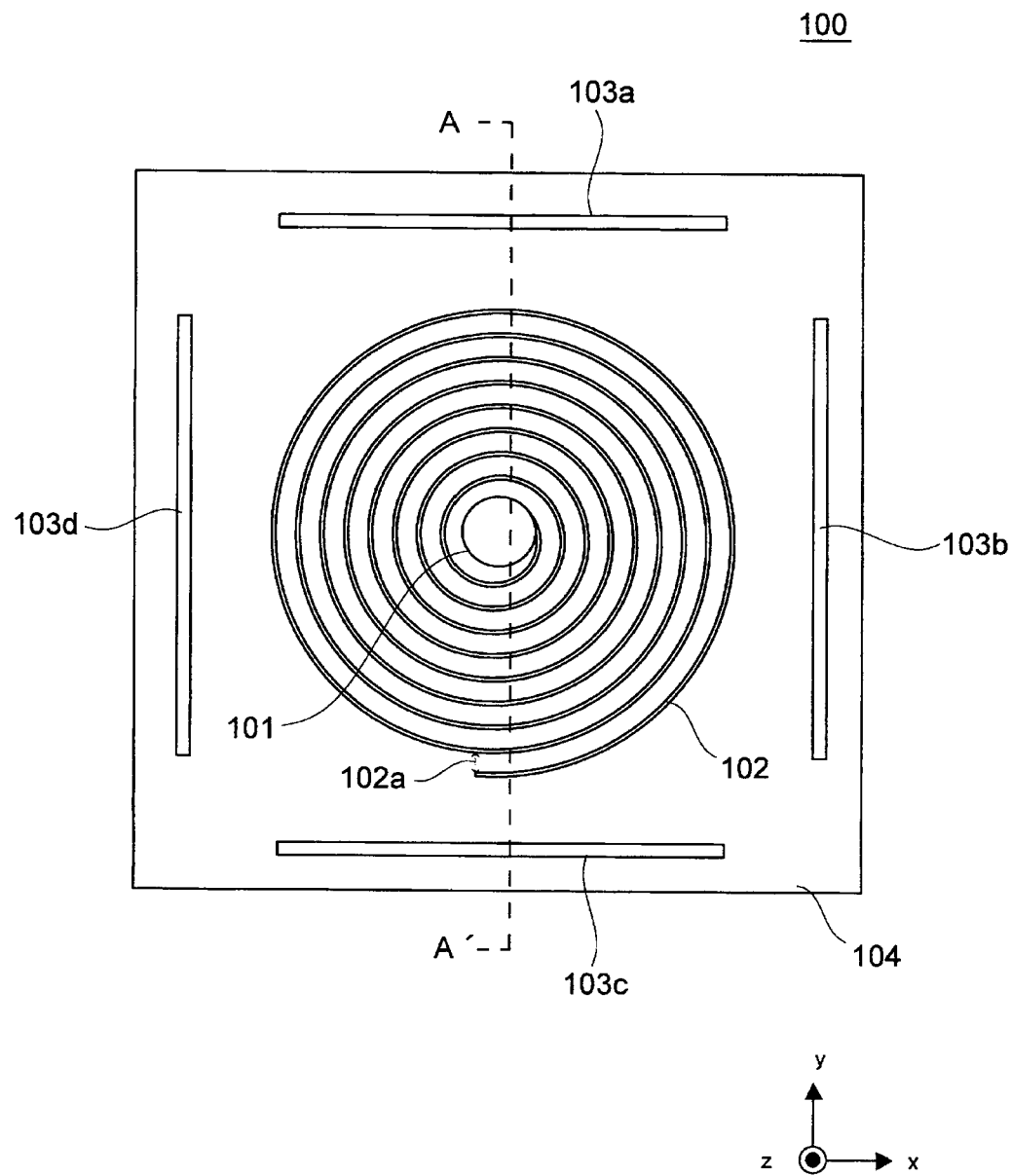
FIG. 1A is a planar diagram which shows an approximate structure of a dynamic quantity sensor related to a first embodiment of the present invention.

First, the basic structure of a dynamic quantity sensor related to the first embodiment of the present invention is explained while referring to FIG. 1A and FIG. 1B. FIG. 1A is a planar diagram which shows an approximate structure of a dynamic quantity sensor related to a first embodiment of the present invention. FIG. 1B is a cross sectional diagram of the dynamic quantity sensor shown in FIG. 1A seen from the line A-A'. The dynamic quantity sensor 100 includes a semiconductor substrate 104, a fixed part 101 formed on the semiconductor substrate 104, a movable electrode 102, and fixed electrodes 103a, 103b, 103c and 103d. The fixed part 101 is fixed on the semiconductor substrate 104. One end of the movable electrode 102 is connected to the fixed part 101 and is formed in a thin plate shape by winding a plurality of times in a spiral shape from the fixed part 101 towards the spiral. The movable electrode 102 has flexibility and transforms in an X, Y and Z direction shown in FIG. 1A according to an applied external force. The structure of the movable electrode 102 is not limited to the shape shown in FIG. 1A and FIG. 1B. For example, the winding gap between an interior spiral side and exterior spiral side may be changed or the width of the movable electrode 102 may be changed between an interior spiral side and exterior spiral side. The movable electrode 102 is a conductor which includes a predetermined resistance ratio $\rho$ ($\Omega \cdot cm$) and includes a resistance value R corresponding to the length L from one end of the movable electrode 102 connected to the fixed part 101 to the other end of the movable electrode 102 on the outermost spiral. Furthermore, the resistance ratio $\rho$ of the movable electrode 102 may be controlled by the concentration of impurities include for example, and the value may be 0.001 Ω·cm or more and 0.02 Ω·cm or less measured by a four-point probe instrument. A film of about 30 nm-100 nm of Ti or Cr etc. may be formed as a lower layer above the movable electrode 102 and a film of about 100 nm-300 nm of Au etc. may be formed as an upper layer using metal film formation, gas dispersion or ion injection and the contact capabilities of the movable electrode 102 may be improved.

The fixed electrodes 103a-103d are positioned on the periphery of the movable electrode 102 and are arranged in a detection direction of the dynamic quantity. FIG. 1A and FIG. 1B show examples of the fixed electrodes 103a-103d arranged at 4 places in an X direction and Y direction. The number and arrangement position of the fixed electrodes may be appropriately changed according to the specifications of the dynamic quantity sensor 100.

The spiral structure of the movable electrode 102 changes shape according to the magnitude of the applied external force, and one part of the spiral structure of the movable electrode 102 contacts with the fixed electrodes 103a-103d which are arranged in the direction in which the external force is applied. At this time, the length of the resistor part of the movable electrode 102 becomes the same as the length from one end connected to the fixed part 101 to the contact part and the resistance value changes. The dynamic quantity sensor 101 detects the magnitude of the external force using the change in the resistance value by the movable electrode 102.

Because a change in resistance value due to a change in the movable electrode 102 is electrically detected, a first terminal (not shown in the diagram) is connected to the fixed part 101, and second terminals (not shown in the diagram) are respectively connected to each fixed electrode 103a-103d. The first terminal and the second terminals are connected to a circuit for processing a dynamic quantity detection signal within an electronic device which is mounted with the dynamic quantity sensor 100.

The movable electrode 102 may also include an aperture part 102a on an end part of the outermost spiral of the spiral shaped structure as is shown in FIG. 1A. The aperture part 102a may be structured so that the end part of the movable electrode 102 is separated from the next outermost spiral by an equal distance as the distance between spirals. Furthermore, the movable electrode 102 may have a shape which does not have the aperture part 102a, wherein the end part may be bonded to the next outermost spiral.

In the first embodiment of the present invention, the movable electrode 102 may be formed in a thin plate shape with a width of 15 μm and height in a Z direction of 50 μm. The movable electrode 102 may include a spiral structure having 1 or more spirals, and the interval between adjacent k-th spiral and k−1 spiral (however, k>1) may be 50 μm. Furthermore, the width, thickness and interval between spirals do not have to be constant from the fixed part 101 up to the end part of the outermost spiral. The fixed part 101 may also have a circular cylindrical shape with a radius of 75 μm and a height in a Z direction of 50 μm. In addition, the fixed electrodes 103a-103d may be formed in a thin plate shape with a height of 1190 μm, width of 100 μm and thickness (height in a Z direction) of 50 μm, and arranged on the periphery of the movable electrode 102. The distance from the fixed electrodes 103a-103d to the fixed part 101 may be set at 70 μm and maybe constant. Furthermore, the dimensions of each part in the embodiments of the present invention may be appropriately changed according to specifications.

[Manufacturing Method of a Dynamic Quantity Sensor]

Next, a manufacturing method of the dynamic quantity sensor 100 related to the first embodiment of the present invention is explained referring to FIG. 2. FIG. 2 is a diagram for explaining a manufacturing process of a dynamic quantity sensor related to the first embodiment of the present invention. FIG. 2 (A) is a cross sectional diagram which shows a semiconductor substrate before processing. FIG. 2 (B) is a cross sectional diagram which shows a process for forming a concave part in a semiconductor substrate. FIG. 2 (C) is a cross sectional diagram which shows a process for forming a fixed part, a movable electrode and a fixed electrode on a semiconductor substrate. Furthermore, similar to FIG. 1B, FIG. 2 (C) is a cross sectional diagram of the dynamic quantity sensor shown in FIG. 1A seen from the line A-A'.

(1) Preparation of a Semiconductor Substrate W (Refer to FIG. 2 (A))

A semiconductor substrate W is prepared in which is an SOI substrate formed by stacking a support layer silicon substrate 104, a middle layer (insulation layer) BOX layer 105, and an upper layer (active layer) silicon film 106. The exterior periphery of the silicon film 106, BOX layer 105 and silicon substrate 104 has a 1.55 mm×1.55 mm approximately rectangular shape and the height of these in a Z direction is 50 μm, 0.5 μm and 400 μm respectively. This external shape and height is merely an example and not limited to these dimensions. The silicon film 106 is a layer which forms the fixed part 101, the movable electrode 102 and fixed electrodes 103a-103d of the dynamic quantity sensor 100. The BOX layer 105 is a layer which bonds the silicon film 106 and the silicon substrate 104, and functions as an etching stopper layer. The silicon substrate 104 forms the first semiconductor substrate 104 of the dynamic quantity sensor 100. The semiconductor substrate W is created by either a SIMOX or bonding method.

(2) Processing of the Silicon Film 106 (Refer to FIG. 2 (B))

A mask (not shown in the diagram) for processing the fixed part 101, movable electrode 102 and fixed electrodes 103a-103d is formed and a concave part 106a is formed except a position in which the fixed part 101, movable electrode 102 and fixed electrodes 103a-103d are formed by etching the silicon film 106 via the mask. DRIE (Deep Reactive Ion Etching) can be used as the etching method.

(3) Processing of the BOX Layer 105 (Refer to FIG. 2 (C))

The BOX layer 105 which contacts with the silicon film 106 in the position in which the movable electrode 102 is formed is removed by side etching the BOX layer 105, and the movable electrode 102 separated from the first semiconductor substrate 104 is formed. Furthermore, the movable electrode 102 which is separated from the first semiconductor substrate 104 is shown having a shape in which the exterior periphery part drops downwards due to weight in FIG. 2(C). As is shown in FIG. 2(C), necessary BOX layers 105a-105d are left only between the fixed part 101, fixed electrodes 103a-103d and the first semiconductor substrate 104. As is shown in FIG. 2(B), because the area in which the BOX layer 105 contacts with the part of the silicon film 106 corresponding to the position at which the fixed part 101 and fixed electrodes 103a-103d are formed is larger than the area of the part of the silicon film 106 which contacts with the BOX layer 105 at the position where the movable electrode 102 is formed, one part of the BOX layers 105a-105d is left and it is possible to form the fixed part 101 and fixed electrodes 103a-103d without being separated from the first semiconductor substrate 104. It is possible to exemplify wet etching using a HF dilution (for example, 50% HF diluted to 10%) as the etchant as the etching method. In addition, it is possible to separate the movable electrode 102 from the first semiconductor substrate 104 by dry etching.

The dynamic quantity sensor 100 related to the first embodiment of the present invention is formed by the above processes.

[Operations of the Dynamic Quantity Sensor]

Next, the operations of the dynamic quantity sensor 100 related to the first embodiment are explained while referring to FIG. 3 and FIG. 4. One end of the movable electrode 102 is supported by the fixed part 101 which is formed on the semiconductor substrate 104 and the dynamic quantity sensor 100 is formed so as to be able to displace within a space which is surrounded by the fixed electrodes 103a-103d as stated above. The movable electrode 102 transforms by an applied external force and contacts with the fixed electrodes 103a-103d. The fixed part 101 and the fixed electrodes 103a-103d are electrically connected to a first terminal and second terminals (not shown in the diagram). A resistance value changes according to the length between a fixed end of the fixed part 101 which is connected to the movable electrode 102 and a position at which the movable electrode 102 contacts the fixed electrodes 103a-103d, and this change in resistance value is detected by a process circuit which is connected to the first and second terminals.

Example operations of the dynamic quantity sensor 100 are explained below based on FIG. 3 and FIG. 4. FIG. 3 is a diagram for explaining the operations of a dynamic quantity sensor related to the first embodiment of the present invention. FIG. 3 (a) is a diagram which shows a state in which the movable electrode 102 contacts a fixed electrode 103b when an external force F1 is applied. FIG. 3 (b) is a diagram which shows a state in which the movable electrode 102 contacts the fixed electrode 103b when an external force F2 which is larger than F1 is applied. FIG. 3 (c) is a diagram which shows a state in which the movable electrode 102 contacts the fixed electrode 103b when an external force F3 which is larger than F2 is applied. FIG. 4 is a diagram which exemplary shows a change in length of the movable electrode 102 corresponding to each operation state shown in FIG. 3 (a) to FIG. 3 (c). FIG. 4 (a) exemplary shows the length of a movable electrode corresponding to the operation state shown in FIG. 3 (a). FIG. 4 (b) exemplary shows the length of a movable electrode corresponding to the operation state shown in FIG. 3 (b). FIG. 4(c) exemplary shows the length of a movable electrode corresponding to the operation state shown in FIG. 3 (c).

The movable electrode 102 transforms and contacts with the fixed electrode 103b at a part B1 on the outermost spiral when the external force F1 is applied in an X direction as is shown in FIG. 3 (a), the movable electrode 102 transforms and contacts with the fixed electrode 103b at a part B2 on the spiral nearest to the outermost spiral when the external force F2 is applied in an X direction as is shown in FIG. 3 (b), and the movable electrode 102 transforms and contacts with the fixed electrode 103b at a part B3 on the spiral two spirals towards the center from the outermost spiral when the external force F3 is applied in an X direction as is shown in FIG. 3 (c). At this time, the external force F is as follows: F1<F2<F3. Furthermore, in FIG. 3, a fixed end at which the movable body 102 is connected to the fixed part 101 is labeled as A1, and the contact positions at which the movable electrode 102 contacts the fixed electrode 103b are given as B1-B3.

The length of the movable electrode 102 from the end part A1 to the contact position B1 is given as L1 when the external force F1 is applied in an X direction as is shown in FIG. 4 (a), the length of the movable electrode 102 from the end part A1 to the contact position B2 is given as L2 when the external force F2 is applied in an X direction as is shown in FIG. 4 (b), and the length of the movable electrode 102 from the end part A1 to the contact position B3 is given as L3 when the external force F3 is applied in an X direction as is shown in FIG. 4 (c). As is shown in FIG. 4, the lengths L from the end part A1 to the contact positions B1-B3 is as follows: L1>L2>L2. In addition, when the electrical resistance of the movable electrode 102 is given as $\rho$ ($\Omega \cdot cm$), an electrical resistance R1 from the end part A1 to the contact position B1 shown in FIG. 4 (a) is $R1 \propto L1 \cdot \rho$. Similarly, an electrical resistance R2 from the end part A1 to the contact position B2 shown in FIG. 4 (b) is $R2 \propto L2 \cdot \rho$, and an electrical resistance R3 from the end part A1 to the contact position B3 shown in FIG. 4 (c) is $R3 \propto L3 \cdot \rho$. Therefore, as the external force F applied becomes larger F1<F2<F3, the electrical resistance R becomes smaller $L1 \cdot \rho > L2 \cdot \rho > L3 \cdot \rho$, and thus it is understood that the resistance value of the movable electrode 102 changes according to the magnitude of the external force.

Furthermore, in the case where the dynamic quantity sensor 100 is used as an acceleration sensor, the change in the resistance value R of the movable electrode 102 per period of time due to the rate of acceleration may be detected. The acceleration rate in an X, Y axis direction can be detected by measuring a change in the resistance level caused by a displacement in the movable electrode 102 on a time axis.

In addition, it is possible for the dynamic quantity sensor 100 to detect the direction of an external force by detecting whether the movable electrode 102 contacts with any one of the fixed electrodes 103a-103d which are arranged on the periphery of the movable electrode 102. For example, as is shown in FIG. 3 (a)-(c), in the case where the movable electrode 102 contacts with the fixed electrode 103b, it can be seen that external forces F1-F3 are applied in an X direction with respect to the dynamic quantity sensor 100. In addition, it is possible to increase the detection direction resolution capability of an external force by further increasing the number of and arranging fixed electrodes 103a-103d. For example, by increasing the number of fixed electrodes to 8 and arranging 2 fixed electrodes up down left and right (X, Y direction) respectively between the fixed part 10, it is possible to increase the detection direction resolution capability for detecting the direction of an applied external force. Furthermore, the number of fixed electrodes is not limited to 8 and can be appropriately changed according to the requested specifications.

According to the dynamic quantity sensor 100 related to the first embodiment of the present invention, because it is possible to detect a change in an external force as a change in a resistance value, it is possible to increase a detection signal level compared to a conventional piezo resistor element type sensor or capacitance sensor. In this way, an amplitude circuit is not required and it is possible to reduce manufacturing costs. In addition, it is possible to detect the direction of an external force by arranging the fixed electrodes 103a-103d on the periphery of the movable electrode 102. Furthermore, because it is possible to simplify the structure compared to a conventional dynamic quantity sensor it is possible to realize an easily manufactured dynamic quantity sensor.

Second Embodiment

Manufacturing Method of a Dynamic Quantity Sensor

Figure 5:
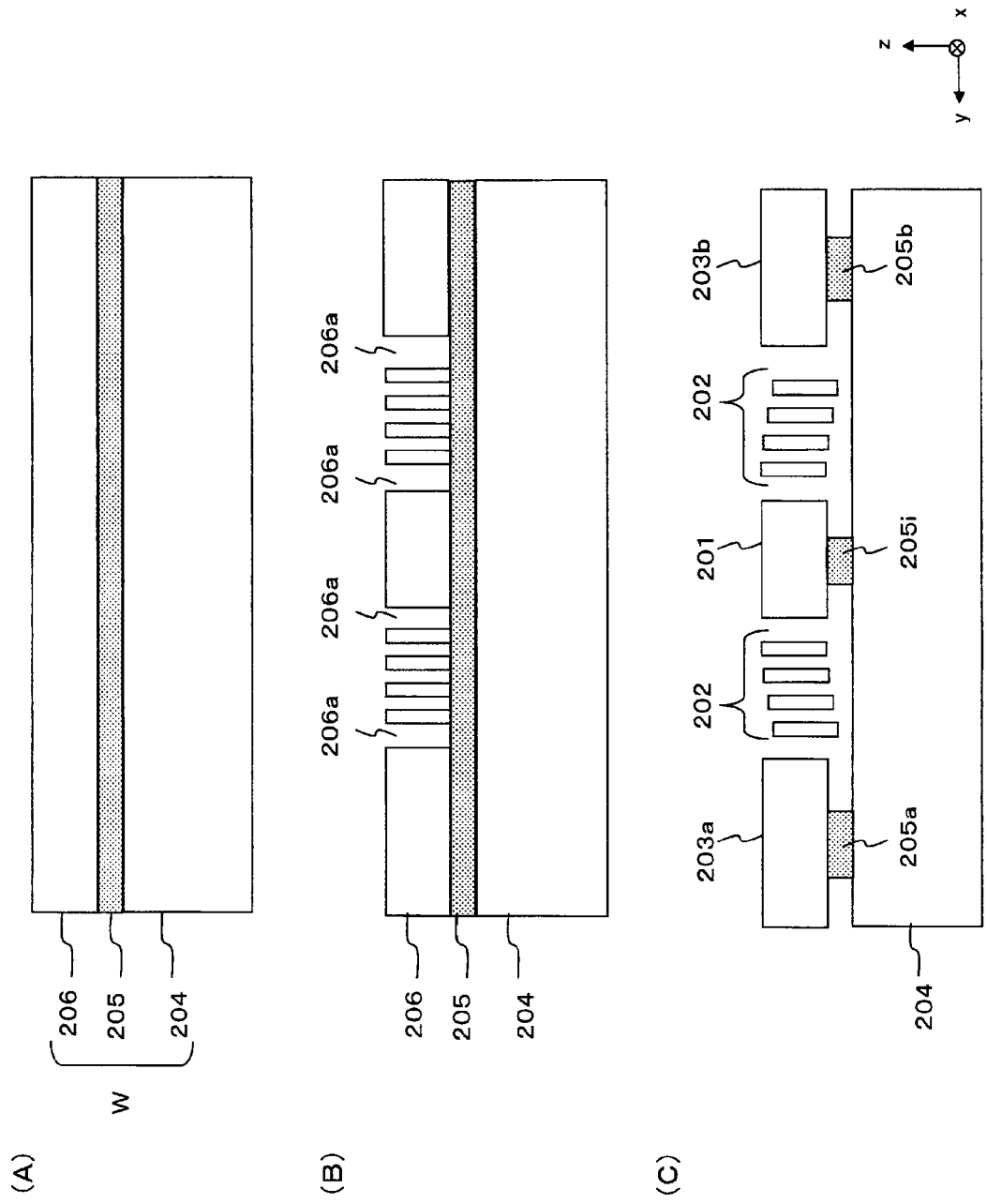
FIG. 5 is a diagram for explaining the manufacturing process of a dynamic quantity sensor related to a second embodiment of the present invention and (A) is a cross sectional diagram which shows a semiconductor substrate before processing, (B) is a cross sectional diagram which shows a process for forming a concave part in a semiconductor substrate, and (C) is a cross sectional diagram which shows a process for forming a fixed part, a movable electrode and a fixed electrode on a semiconductor substrate.
Figure 6:
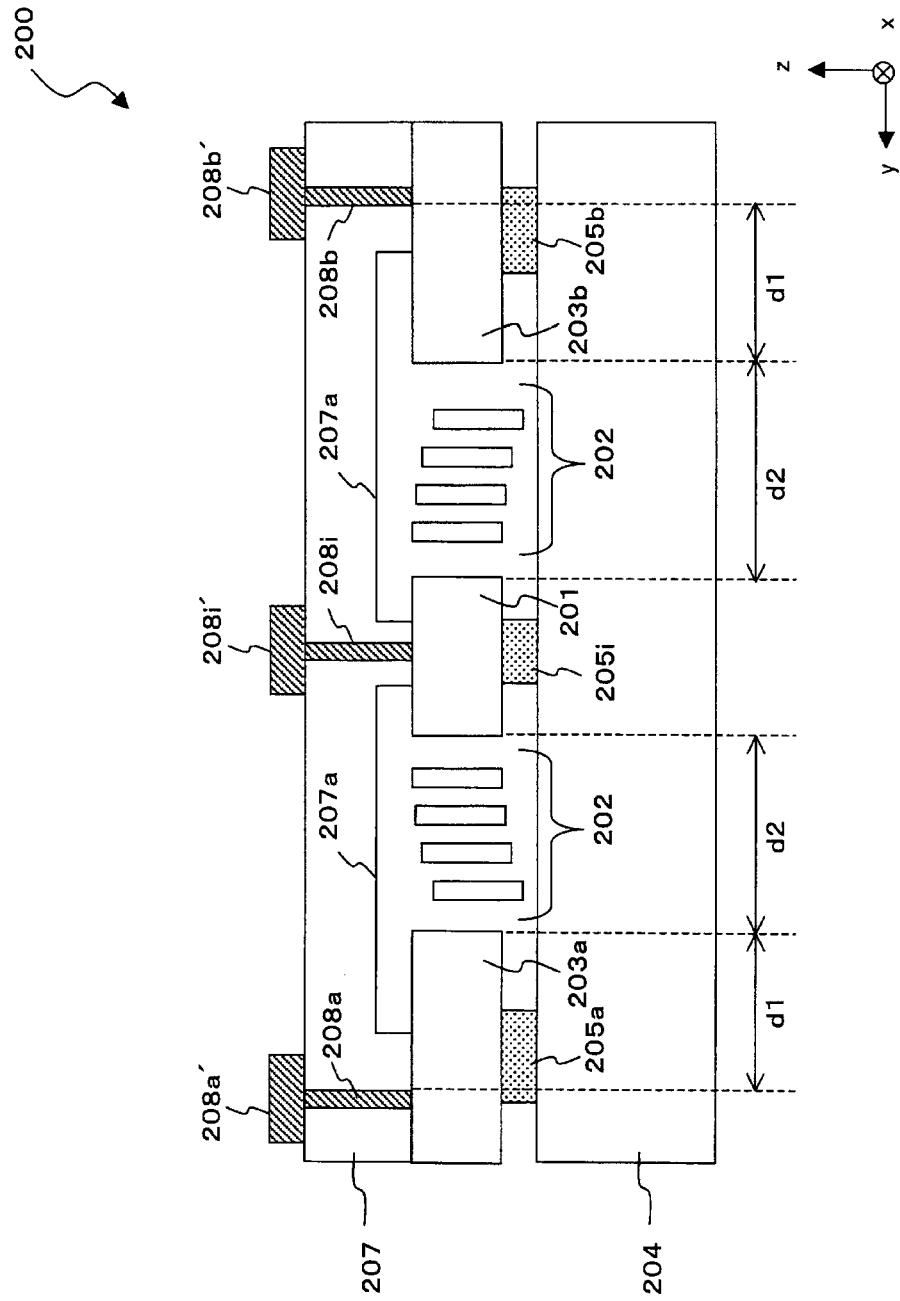
FIG. 6 is a cross sectional diagram which shows a dynamic quantity sensor related to the second embodiment of the present invention.
Figure 7:
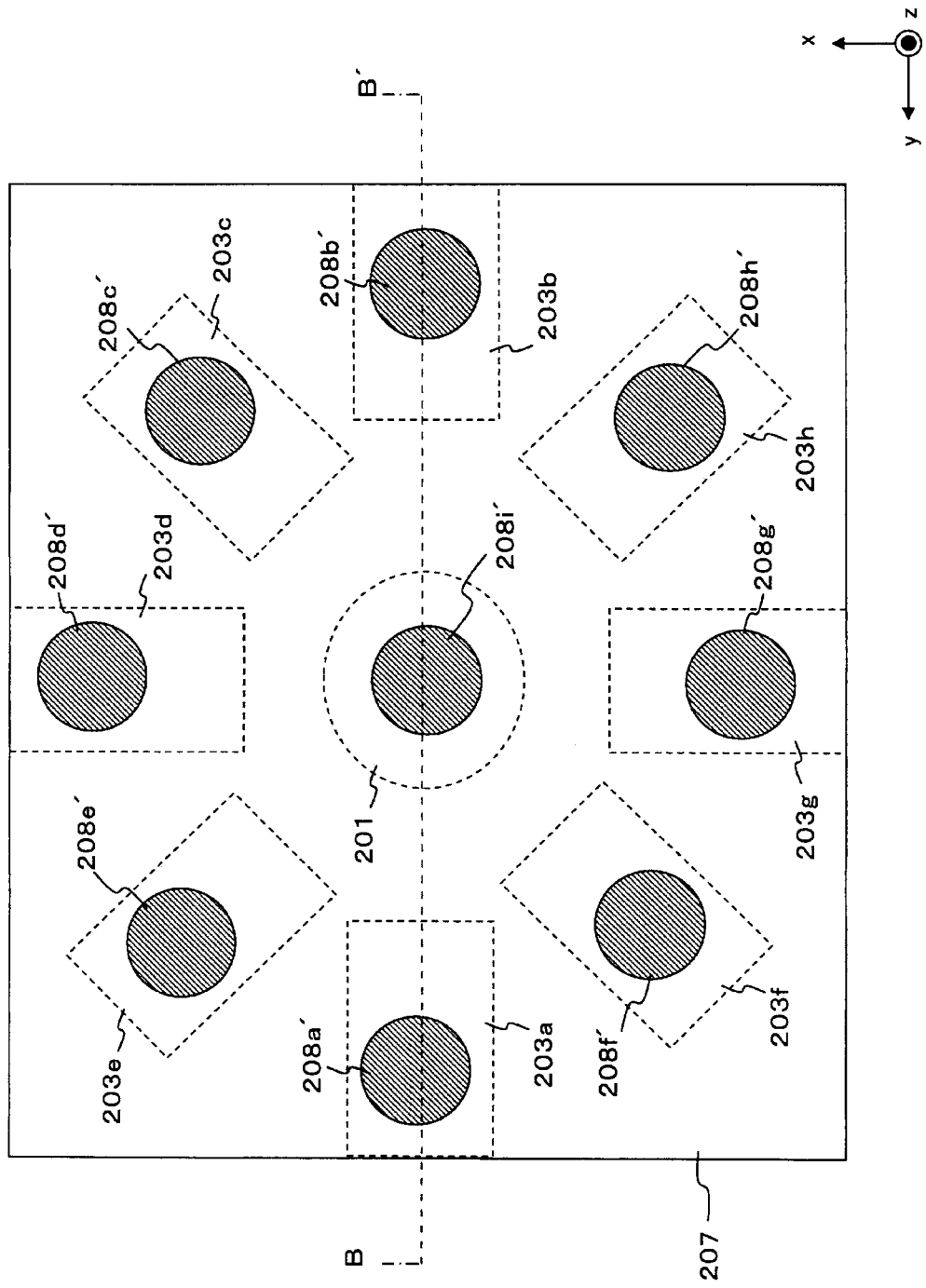
FIG. 7 is a planar diagram which shows an approximate structure of a second semiconductor substrate of the dynamic quantity sensor related to the second embodiment of the present invention seen from the top surface.

A manufacturing method of a dynamic quantity sensor 200 related to the second embodiment is explained while referring to FIG. 5 (A)-FIG. 5 (C), FIG. 6 and FIG. 7. FIG. 5 (A)-FIG.

5 (C) and FIG. 6 are diagrams for explaining the manufacturing processes which show an approximate structure of a cross section of the dynamic quantity sensor 200, and FIG. 7 is a planar diagram which shows an approximate structure of a second semiconductor substrate 207 of the dynamic quantity sensor 200 in FIG. 6 seen from above. Furthermore, FIG. 6 shows a cross section of the dynamic quantity sensor 200 shown in FIG. 7 seen from the line B-B'.

(1) Preparation of a Semiconductor Substrate W (Refer to FIG. 5 (A))

A semiconductor substrate (SOI substrate) W is prepared by stacking a support layer silicon substrate 204, a middle layer BOX layer 205 and an upper layer silicon film 206. For example, the exterior periphery of the silicon film 206, BOX layer 205 and the silicon substrate 204 has a 1.55 mm×1.55 mm approximately square shape and the height of these in a Z direction is 50 µm, 0.5 µm and 400 µm respectively. These external shapes and heights are not limited to these examples. The silicon film 206 is a layer which forms a fixed part 201, movable electrode 202 and fixed electrodes 203a-203h of the dynamic quantity sensor 200. The BOX layer 205 is a layer which bonds the silicon film 206 and the silicon substrate 204 and functions as an etching stopper layer. The silicon substrate 204 forms the first silicon substrate 204 of the dynamic quantity sensor 204. The semiconductor substrate W is created by SIMOX or a bonding method.

(2) Processing of the Silicon Film 206 (Refer to FIG. 5 (B))

A mask (not shown in the diagrams) for processing the fixed part 201, the movable electrode 202 and the fixed electrodes 203a-203h is formed and a concave part 206a except a position in which the fixed part 201, the movable electrode 202 and the fixed electrodes 203a-203h are formed is formed by etching the silicon film 206 via the mask. DRIE (Deep Reactive Ion Etching) can be used as the etching method.

(3) Processing of the BOX Layer 205 (Refer to FIG. 5 (C))

The BOX layer 25 which contacts with the silicon film 206 at the position where the movable electrode 202 is formed is removed by side etching the BOX layer 205, and the movable electrode 202 is formed separated from the first semiconductor substrate 204. At this time, necessary BOX layers 205a-205i are left only between the fixed part 201, fixed electrodes 203a-203h and the first semiconductor electrode 204 (refer to FIG. 6). As is shown in FIG. 5 (B) because the area of the silicon film 206 corresponding to the position in which the fixed part 201 and the fixed electrodes 203a-203h are formed which contacts with the BOX layer 25 is larger than the area which contacts with the BOX layer 205 at the position in which the movable electrode 202 is formed, one part of the BOX layers 205a-205i is left, and it is possible to form the fixed part 201 and the fixed electrodes 203a-203h without being separated from the first semiconductor substrate 204. Furthermore, it is possible to exemplify wet etching using a HF dilution (for example, 50% HF diluted to 10%) as the etchant as the etching method. In addition, it is possible to exemplify dry etching using a RIE method which uses a combination gas of $CF_4$ and $O_2$.

(4) Forming a Second Semiconductor Substrate 207 (Refer to FIG. 6, FIG. 7)

A second semiconductor substrate 207 shown in FIG. 6 and FIG. 7 is formed by any one of glass, a semiconductor, a metal or resin material having insulation properties. Below, the case where glass is used as the second semiconductor substrate 207 is explained. A glass substrate including a movable ion (for example, Tempax (registered trademark) Glass) can be used. As is shown in FIG. 6, a concave part 207a is formed on the second semiconductor substrate 207 in a position corresponding to a position opposite the movable electrode 202 of the first semiconductor substrate 204 by etching or sandblasting.

(5) Forming Through Hole Electrodes 208a-208i (Refer to FIG. 6, FIG. 7)

As is shown in FIG. 6, through hole electrodes 208a-208i are formed which penetrate from the top to the bottom of the second semiconductor substrate 207. In the manufacturing process described later, because the through hole electrodes 208a-208i are electrically connected to the fixed part 201 and the fixed electrodes 203a-203h of the first semiconductor substrate 204 respectively when the first semiconductor substrate 204 and the second semiconductor substrate 207 contact, they are each formed in a position opposite the first fixed part 201 and the fixed electrodes 203a-203h. A through hole (not shown in the diagram) is formed in each formation position of the through hole electrodes 208a-208i by sandblasting the second semiconductor substrate 207 formed with a predetermined mask. The through hole electrodes 208a-208i are formed inside the through holes by arranging a conducting material having conducting properties using conducting paste filling (screen printing), a CVD (Chemical Vapor Deposition) method or electrolytic plating. For example, the through hole electrodes 208a-208i may be formed by depositing a conducting layer comprised of poly-silicon may on the inner wall of a through hole using a CVD method. Other than poly-silicon, a metal material (Ti, Cu, etc.) may be used as the conducting layer.

(6) Bonding the First Semiconductor Substrate 204 and the Second Semiconductor Substrate 207 (Refer to FIG. 6)

The first semiconductor substrate 204 and the second semiconductor substrate 207 are bonded by an anode bonding method. At this time, as shown in FIG. 6, the through hole electrodes 208a-208i which are formed on the second semiconductor substrate 207 and the first fixed part 201, fixed electrodes 203a-203h formed on the first semiconductor substrate 204 are each bonded so that they are electrically connected. In addition, a concave part 207a which is formed on the second semiconductor substrate 207 and the movable electrode 202 which is formed on the first semiconductor substrate 204 are bonded at a position opposite each other. Furthermore, as is shown in FIG. 6, a distance d1 up to a connection point of the through hole electrodes 208a-208i from each end part of the fixed electrodes 203a-203h which are in contact with the movable electrode 202 are each made the same distance. In addition, the fixed electrodes 203a-203h are arranged at a fixed distance d2 from the fixed part 201. In this way, it is possible to reduce a difference in a resistance value caused by a difference in contact positions when the movable electrode 202 contacts the fixed electrodes 203a-203h.

(7) Forming Terminals for a Wire 208a'-208i' (Refer to FIG. 6, FIG. 7)

FIG. 7 is a planar diagram which shows an example of an upper surface of the second semiconductor substrate 207 shown in FIG. 6. As is shown in FIG. 6 and FIG. 7, the terminals for a wire 208a'-208i' are arranged corresponding to an upper part which on which the through hole electrodes 208a-208i are exposed on the upper surface of the second semiconductor surface 207 and may be formed by a pattern comprised of A1 for example so that they are electrically connected with the through hole electrodes 208a-208i. These terminals for wires 208a'-208i' are connected to a circuit for processing a dynamic quantity detection signal within an electrical apparatus mounted with the dynamic quantity sensor 200. Furthermore, the through hole electrode 208i connected to the fixed part 201 and the terminal for wire 208i' function as the first terminal described above, and the through hole electrodes 208a-208h connected to the fixed electrodes 203a-203h and the terminals for wires 208a'-208h' function as the second terminal described above. The terminals for wires 208a'-208i' may be formed on the second semiconductor substrate 207 before bonding of the first semiconductor substrate 204 and the second semiconductor substrate 207.

The dynamic quantity sensor 200 related to the second embodiment of the present invention is formed by the above processes.

Figure 8:
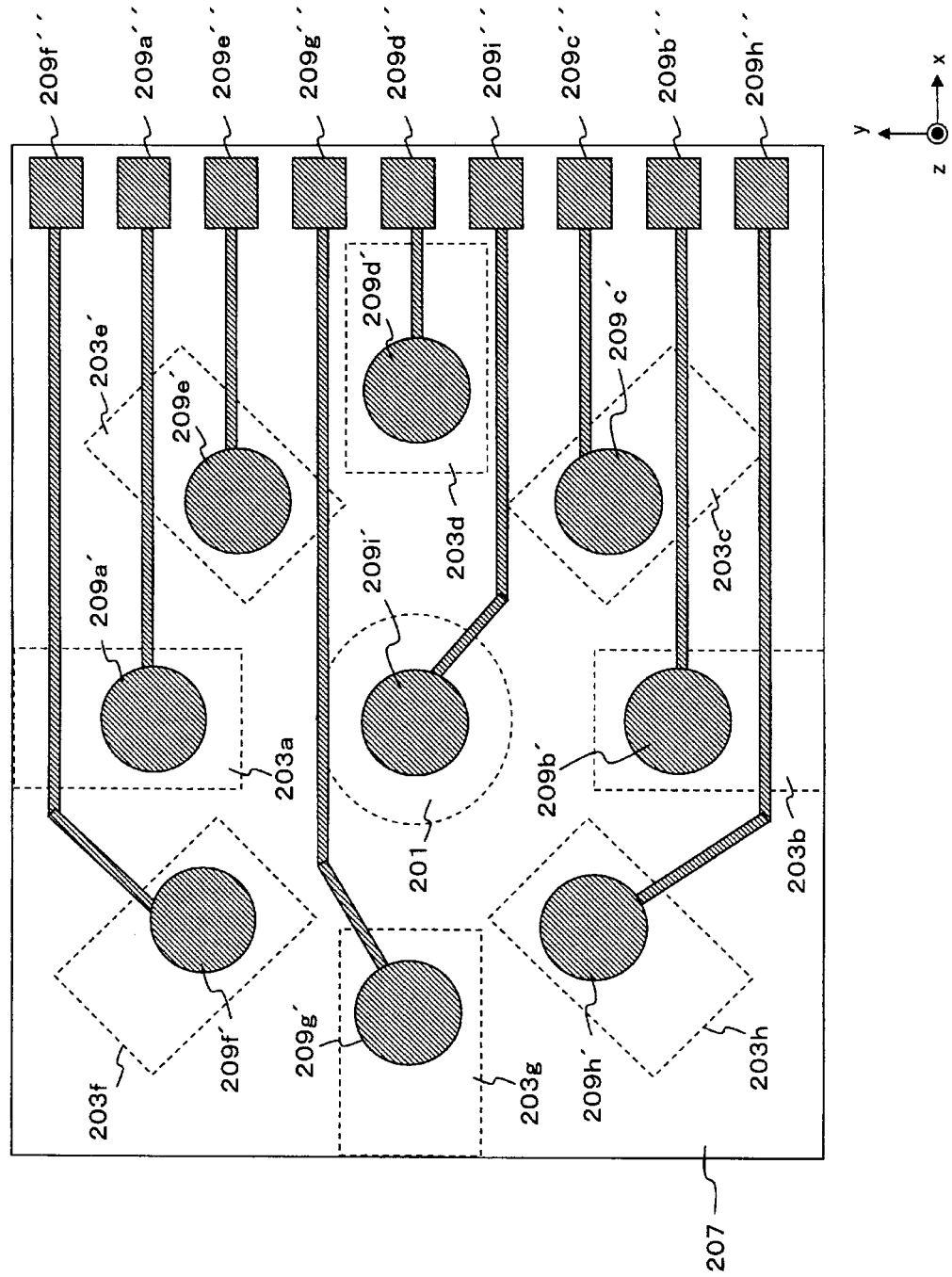
FIG. 8 is a planar diagram which shows an alternative example of the second semiconductor substrate of the dynamic quantity sensor related to the second embodiment of the present invention.

Furthermore, the dynamic quantity sensor 200 related to the second embodiment of the present invention is not limited to the structure of the second semiconductor substrate 207 shown in FIG. 7, for example, the dynamic quantity sensor 200 may also have the structure shown in FIG. 8.

FIG. 8 shows another embodiment of the second semiconductor substrate 207 and is a planar diagram of the second semiconductor substrate 207 formed with the terminals for wires 208a'-208i' seen from above. As is shown in FIG. 8, the terminals for wires 208a"-208i" which are connected to the terminals for wires 208a'-208i' may be formed near one side end part of the upper surface of the second semiconductor substrate 207 (right side of the second semiconductor substrate 207 in the diagram). The terminals for wires 208a'-208i', 208a"-208i" may each formed from a metal layer in the order Cr layer, Au layer by vapor deposition method or sputter method and removing unnecessary metal layers by etching.

According to the dynamic quantity sensor 200 related to the second embodiment of the present invention, the movable electrode 202 changed due to an applied external force and one part of the movable electrode 202 contacts with any one of the fixed electrodes 203a-203h which are arranged on the periphery of the movable electrode 202. At this time, the length as a resistor of the movable electrode 202 becomes the length from one end part connected to the fixed part 201 to a contact part and a resistance value changes according to the magnitude of the applied external force. A detection signal corresponding to a change in the resistance value is detected by a process circuit connected to the dynamic quantity sensor 200 and therefore it is possible to detect the magnitude of an external force. In addition, the dynamic quantity sensor 200 related to the second embodiment of the present invention has a simple structure compared to a conventional sensor which uses a piezo resistance element or a capacitance type sensor. Therefore, it is possible to reduce manufacturing processes and thereby manufacturing costs.

Third Embodiment

Manufacturing Method of a Dynamic Quantity Sensor

Figure 9:
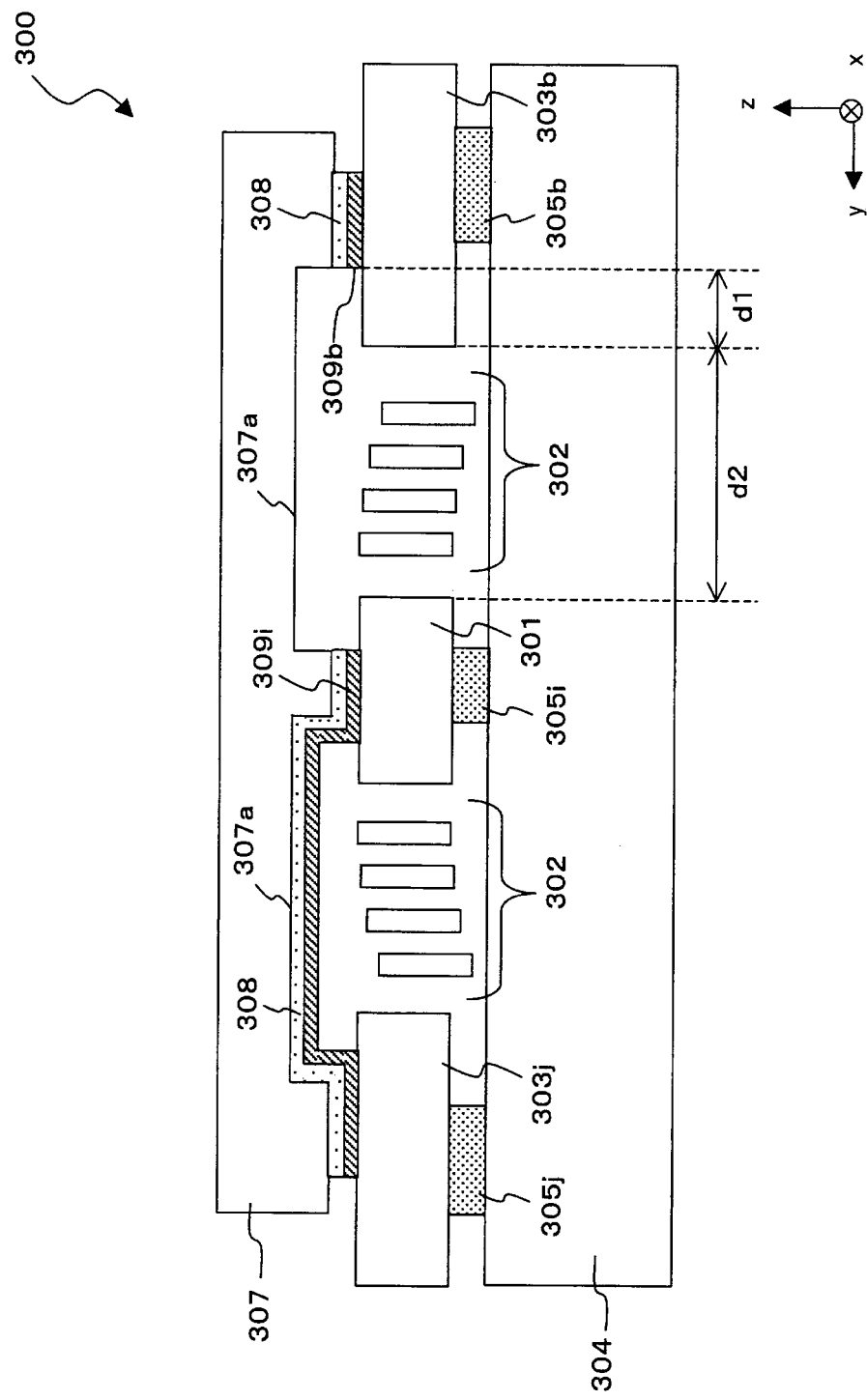
FIG. 9 is a cross sectional diagram which shows a dynamic quantity sensor related to a third embodiment of the present invention.
Figure 10:
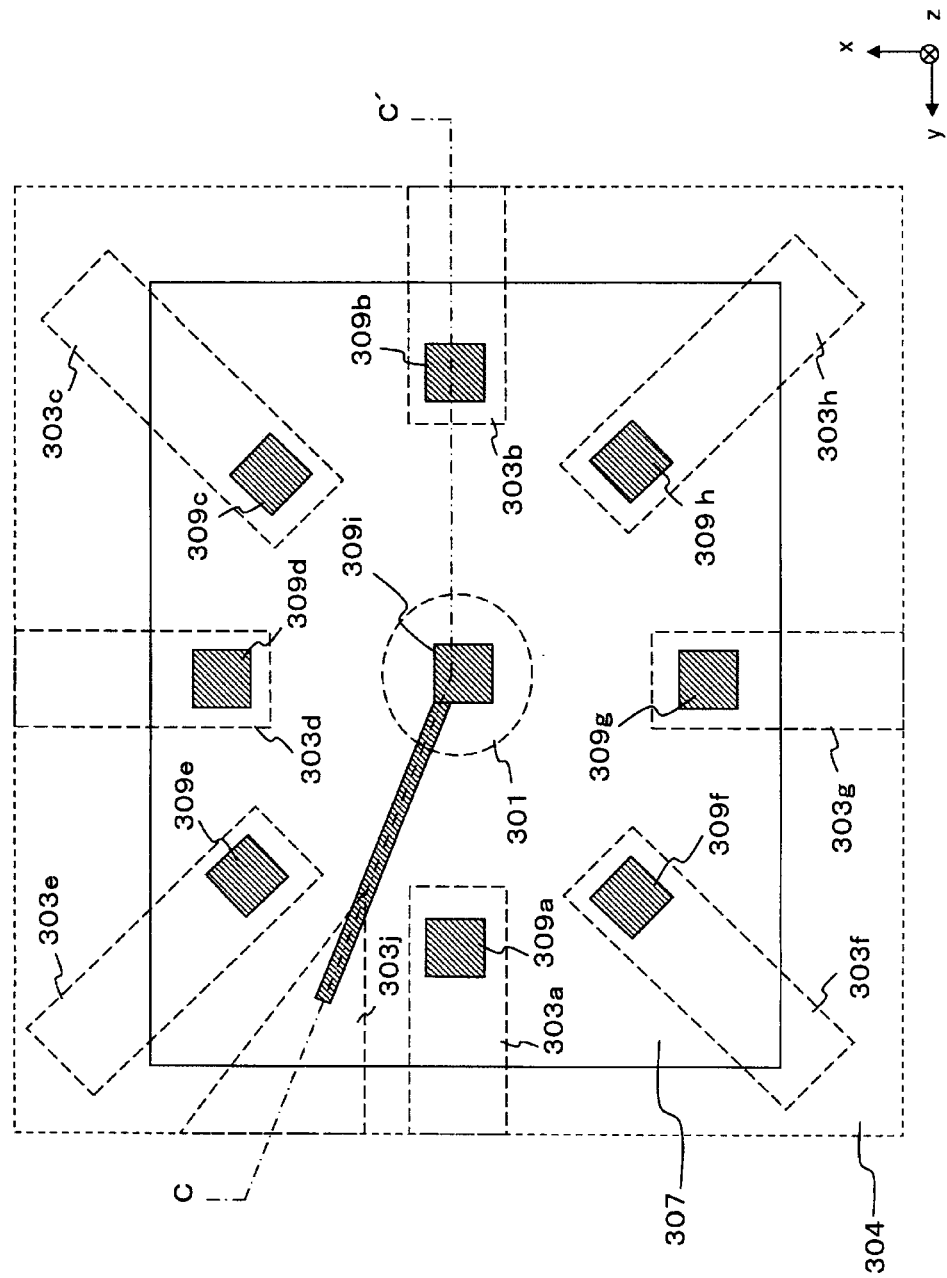
FIG. 10 is a planar diagram which shows an approximate structure of a second semiconductor substrate of the dynamic quantity sensor related to the third embodiment of the present invention seen from the bottom surface.

Next, a manufacturing method of a dynamic quantity sensor 300 related to the third embodiment is explained while referring to FIG. 9 and FIG. 10. FIG. 9 shows an approximate structure of a cross section of the dynamic quantity sensor 300, and FIG. 10 shows an approximate structure of a second semiconductor substrate 307 of the dynamic quantity sensor 300 seen from below. Furthermore, FIG. 9 shows a cross section of the dynamic quantity sensor 300 shown in FIG. 10 seen from the line C-C'.

As is shown in FIG. 9, the dynamic quantity sensor 300 related to the third embodiment of the present invention is formed with a fixed part 301, a movable electrode 302 and fixed electrodes 303a-303h on a first semiconductor substrate 304 via the same processes as the manufacturing processes shown in FIG. 5 (A)-(C). In addition, a fixed part electrode 303j which is electrically connected with the fixed part 301 is formed via the same manufacturing processes as the fixed electrodes 303a-303h.

A glass substrate may be used as the second semiconductor substrate 307 the same as the second semiconductor substrate 207 of the dynamic quantity sensor 300 shown in FIG. 6. The second semiconductor substrate 307 is formed with a concave part 307a by etching or sandblasting and which corresponds to a position opposite the movable electrode 302 of the first semiconductor substrate 304.

An insulation layer 308 is formed by patterning on the surface (lower surface in FIG. 9) of the second semiconductor substrate 307 formed with the concave part 307a and matches each formation position of electrodes 309a-309i shown in FIG. 10, and electrodes 309a-309i are formed on the insulation layer 308. The electrodes 309a-309i are electrically connected with the fixed part 301 of the first semiconductor substrate 304 and each of the fixed electrodes 303a-303h respectively, and because the electrodes 309a-309i function as the first terminal and second terminals stated above, each is formed by patterning at a position opposite the fixed part 301 and the fixed electrodes 303a-303h.

The insulation layer 308 is comprised of an inorganic insulation layer such as silicon oxide or silicon nitride for example. In the case of silicon oxide, the insulation layer 308 may be formed using a thermal oxidation method or a CVD method (Chemical Vapor Deposition). In addition, in the case of silicon nitride, the insulation layer 308 may be formed used the CVD method. The electrodes 309a-309i are comprised of metal or a material such as poly-silicon and this material can be appropriately selected according to the material of the bonded first semiconductor substrate 304 and the second semiconductor substrate 307 or bonding method.

Furthermore, because the size of the entire second semiconductor substrate 307 is smaller than the size of the entire first semiconductor substrate 304, the second semiconductor substrate 307 is bonded to the first semiconductor substrate 304 so that the exterior periphery region of the first semiconductor substrate 304 is exposed. At this time, the second semiconductor substrate 307 is bonded so that a part near the end part of the fixed electrodes 303a-303h and the fixed part electrode 303j formed on the first semiconductor substrate 304 is exposed.

When the first semiconductor substrate 304 and the second semiconductor substrate 307 are bonded, the fixed part 301 and the fixed electrodes 303a-303h formed on the first semiconductor substrate 304 are each electrically connected to the electrodes 309a-309i of the second semiconductor substrate 307. Furthermore, as is shown in FIG. 9, the distance d1 from each end part of the fixed electrodes 303a-303h which contact with the movable electrode 302 to the connection part of the electrodes 309a-309h is the same. In addition, the fixed electrodes 303a-303h are arranged at a fixed distance d2 from the fixed part 301. In this way, it is possible to reduce a difference in a resistance value caused by a difference in contact positions when the movable electrode 302 contacts the fixed electrodes 303a-303h.

FIG. 10 is a planar diagram of the second semiconductor substrate 307 formed with the electrodes 309a-309i of the dynamic quantity sensor 300 seen from the bottom surface. Furthermore, the position in which the first semiconductor substrate 304, fixed electrodes 303a-303h, and the fixed electrode 301 are arranged when the first semiconductor substrate 304 is bonded is shown by a dotted line in FIG. 10. In addition, although not shown in the diagram, the insulation layer 308 is formed between the electrodes 309a-309i and the second semiconductor substrate 307.

As is shown in FIG. 10, the electrode 309i which is electrically connected with the fixed part 301 is electrically connected with the fixed part electrode 303j formed on the first semiconductor substrate 304. Although not shown in the diagram, wires are connected to the region of the fixed electrodes 303a-303h and the fixed part electrode 303j which is exposed further to the exterior than the second semiconductor substrate 307 by a method such as wire bonding. These wires are connected to a process circuit for processing a dynamic quantity detection signal within an electronic device which is mounted with the dynamic quantity sensor 300.

The dynamic quantity sensor 300 related to the third embodiment of the present invention is formed with the processes described above.

Figure 11:
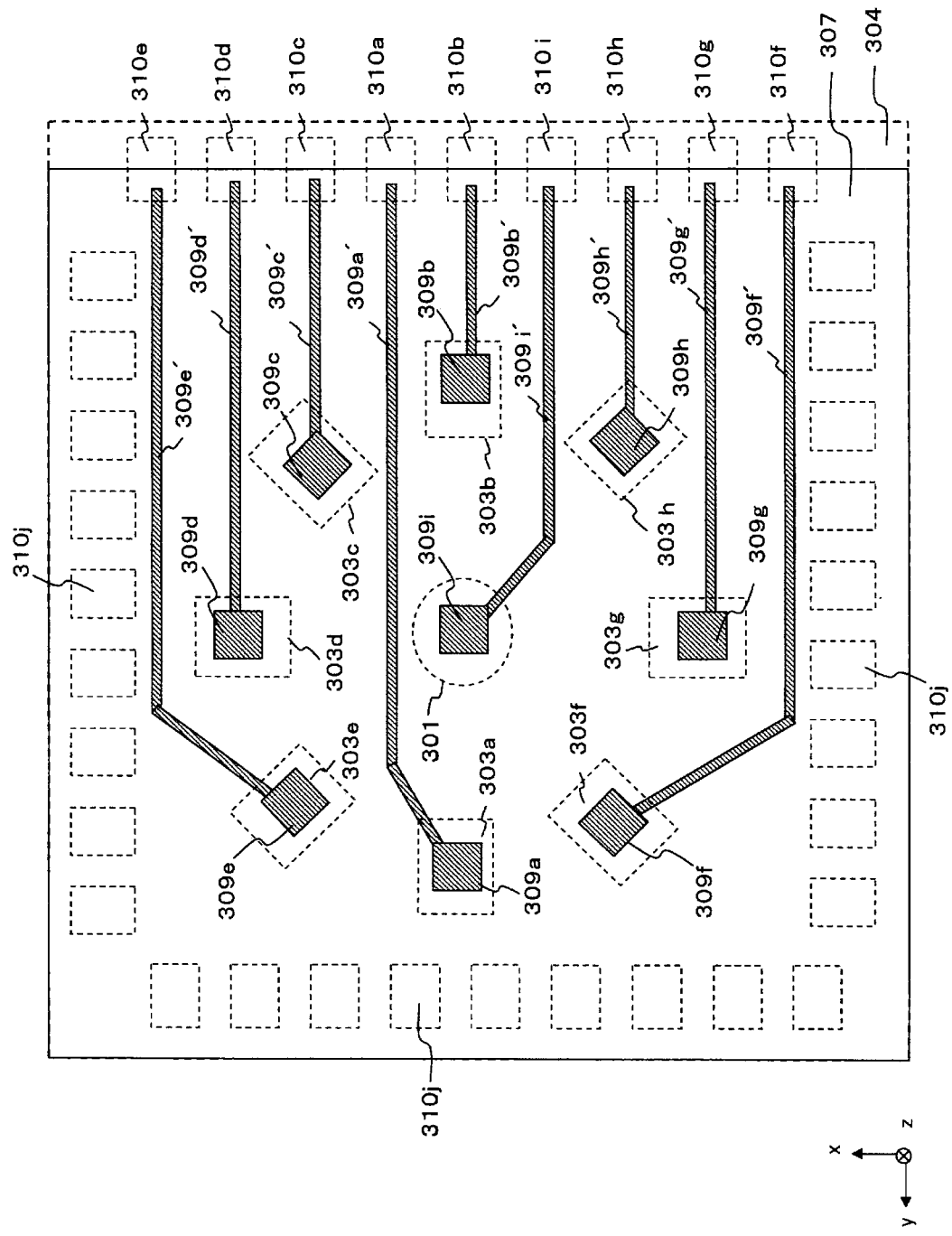
FIG. 11 is a planar diagram which shows an alternative example of the second semiconductor substrate of the dynamic quantity sensor related to the third embodiment of the present invention.

Furthermore, the dynamic quantity sensor 300 related to the third embodiment of the present invention is not limited to the structure of the second semiconductor substrate 307 shown in FIG. 10 and may have a structure as is shown in FIG. 11 for example.

FIG. 11 shows another embodiment of the second semiconductor substrate 307 and is a planar diagram of the second semiconductor substrate 307 formed with the electrodes 309a-309i seen from the bottom surface. FIG. 11 shows an example of the formation of a dummy terminal 310j on an exterior periphery region of the second semiconductor substrate 307 and whereby balance is achieved when bonding with the first semiconductor substrate 304.

As is shown in FIG. 11, wire patterns 309a'-309i' which are electrically connected with the electrodes 309a-309i are formed on the second semiconductor substrate 307, and may be formed so that they are each connected to wire terminals 310a-310i which are formed near one side end part (right side of the first semiconductor substrate 304 in the diagram) of the first semiconductor substrate 304. Furthermore, the arrangement position of the first semiconductor substrate 304, the fixed electrodes 303a-303h, the fixed part 301, the wire terminals 310a-310i and a plurality of dummy terminals 310j when the first semiconductor substrate 304 is bonded is shown by a dotted line in FIG. 11. Furthermore, although not shown in the diagram, an insulation layer is formed between the electrodes 309a-309i, wire patterns 309a'-309i' and the second semiconductor substrate 307.

The dummy terminal 310j is formed near an end part of the exterior periphery of the first semiconductor substrate 304 except near the one side end part in which the wire terminals 310a-310i are formed. The wire terminals 310a-310i which are formed only on one side end part of the first semiconductor substrate 304 prevent unstable bonding of the first semiconductor substrate 304 and the second semiconductor substrate 307 and the dummy terminal 310j is formed so that the entire external periphery of the first semiconductor substrate 304 and the entire external periphery of the second semiconductor substrate 307 are bonded. As a result, the shape of each dummy terminal 310j is preferred to be the same shape as each of the wire terminals 310a-310i respectively. The second semiconductor substrate 307 shown in FIG. 11 overlaps a part of the wire terminals 310a-310i and is bonded so that a part is exposed. Although not shown in the diagram, a region of the wire terminals 310a-310i which is exposed further to the exterior than the second semiconductor substrate 307, may be connected to an external circuit by wire bonding etc.

The dynamic quantity sensor 300 related to the third embodiment of the present invention manufactured by the processes described above can detect the magnitude of a biaxial direction (X direction, Y direction) external force the same as the dynamic quantity sensor 200 related to the second embodiment. In addition, the dynamic quantity sensor 300 related to the third embodiment of the present invention has a simple structure compared to a conventional sensor which uses a piezo resistance element or a capacitance type sensor. Therefore, it is possible to reduce manufacturing processes and thereby manufacturing costs.

Fourth Embodiment

Manufacturing Method of a Dynamic Quantity Sensor

Figure 12:
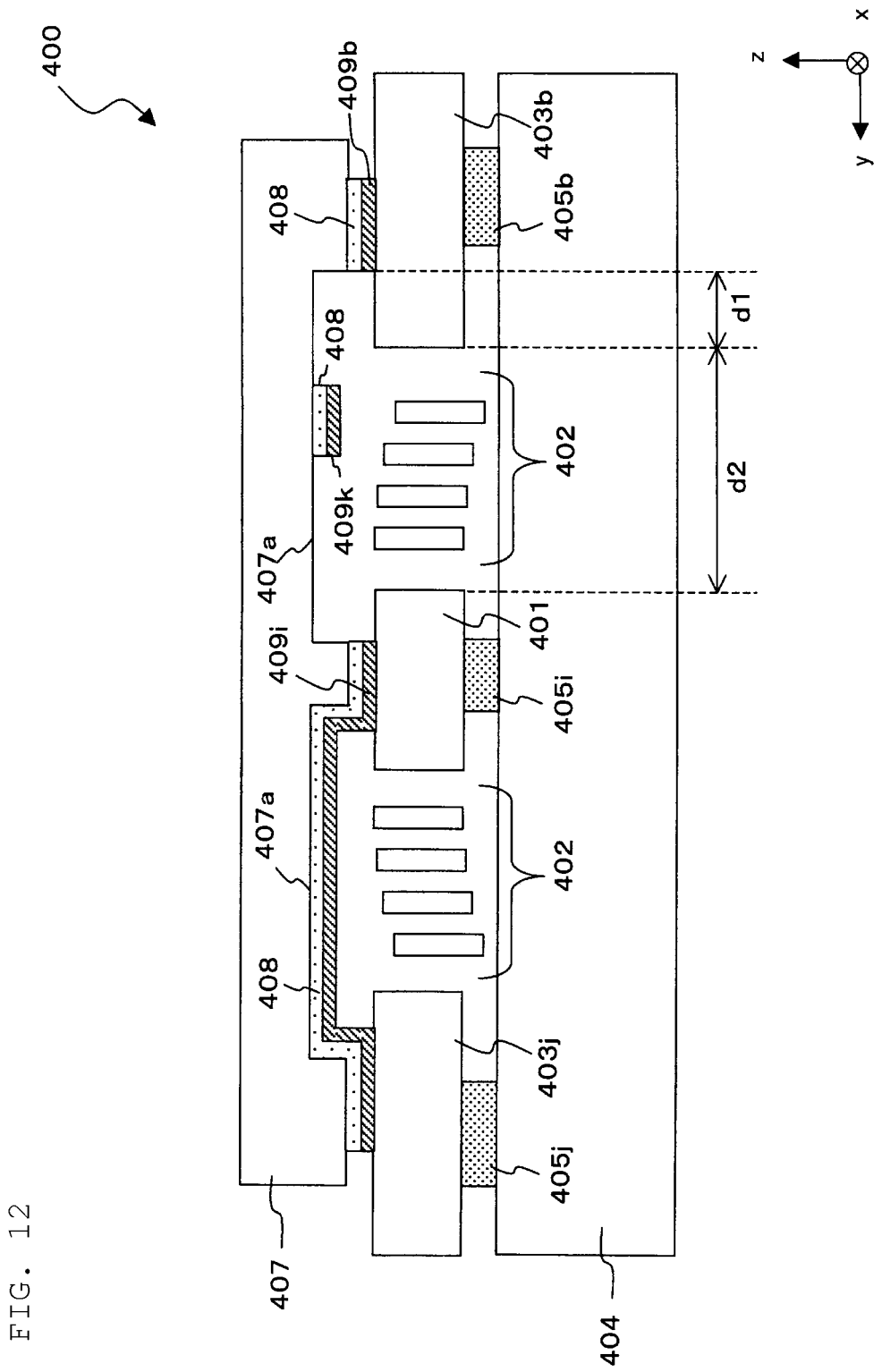
FIG. 12 is a cross sectional diagram which shows a dynamic quantity sensor related to a fourth embodiment of the present invention.
Figure 13:
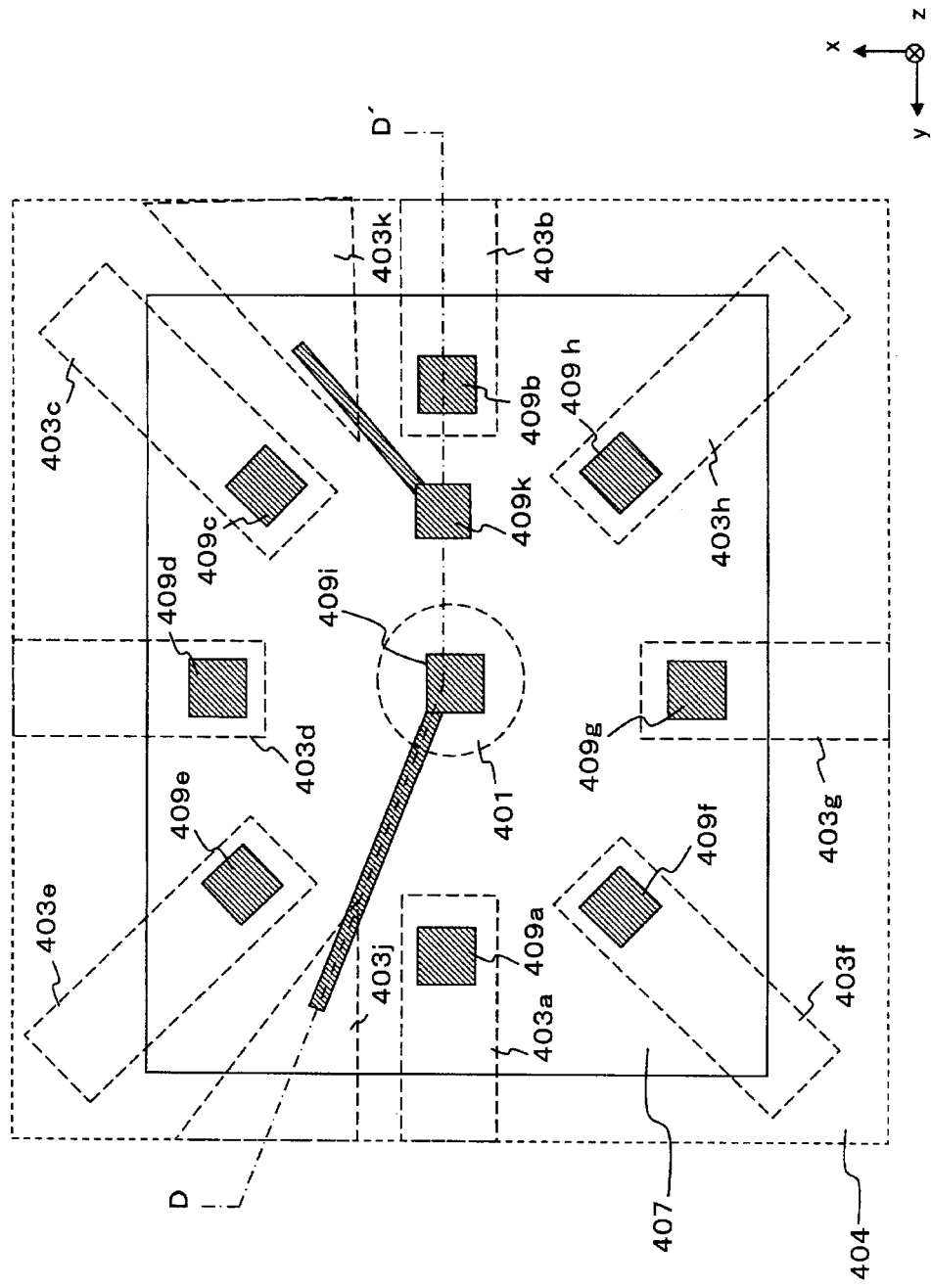
FIG. 13 is a planar diagram which shows an approximate structure of a second semiconductor substrate of the dynamic quantity sensor related to the fourth embodiment of the present invention seen from the bottom surface.

Furthermore, a structure of a dynamic quantity sensor 400 and a manufacturing method of the dynamic quantity sensor 400 which can detect the magnitude, direction and acceleration of a triaxial (X direction, Y direction, Z direction) external force are explained while referring to FIG. 12 and FIG. 13.

FIG. 12 is a cross sectional diagram which shows the dynamic quantity sensor 400 related to the fourth embodiment of the present invention. FIG. 13 is a planar view diagram of a second semiconductor substrate 407 of the dynamic quantity sensor 400 shown in FIG. 12 seen from the bottom surface. Furthermore, FIG. 12 shows a cross section of the dynamic quantity sensor 400 seen from the line D-D'.

The dynamic quantity sensor 400 is formed with a fixed part 401, a movable electrode 402, fixed electrodes 403a-403h, and a fixed part electrode 403j on a first semiconductor substrate 404, and a concave part 407a, an insulation layer 408 and electrodes 409a-409i on the second semiconductor substrate 407 by the same manufacturing processes as the dynamic quantity sensor 300 related to the third embodiment.

In addition, unlike the dynamic quantity sensor 300 related to the third embodiment, in order for the dynamic quantity sensor 400 to detect the magnitude, direction and acceleration of an external force in a Z direction, an electrode 409k having the same function as the fixed electrodes 403a-403h is formed on the second semiconductor substrate 407 via the same manufacturing method as the electrodes 409a-409i. In addition, a fixed electrode 403k which is electrically connected with the electrode 409k is formed on the first semiconductor substrate 404 by the same manufacturing processes as the fixed electrodes 403a-403h.

The electrode 409k is formed on the concave part 407a of the second semiconductor substrate 407 which is in a position opposite the movable electrode 402 and is arranged in a position which is in contact with the movable electrode 402 which transforms by an external force in a Z direction. As is shown in FIG. 12, an insulation layer 408 is formed on the concave part 407a of the second semiconductor substrate 407 matching the formation position of the electrode 409k by patterning and the electrode 409k is formed on the insulation layer 408 by patterning. Furthermore, only one example of the electrode 409k which detects an external force in a Z direction is shown in FIG. 12 and FIG. 13, however, the number of electrodes 409k is not limited to this. A plurality of electrodes may be formed according to the specifications. It is possible to increase the Z direction external force detection direction resolution capabilities by arranged a plurality of fixed electrodes 409k according to the detected direction.

In addition, a distance d1 from each end part of the fixed electrodes 403a-403h which contact with the movable electrode 402 to the connection part of the electrodes 409a-409h in the dynamic quantity sensor 400 is also the same as in the dynamic quantity sensors 200, 300 related to the first and third embodiments shown in FIG. 12. Also, the fixed electrodes 403a-403h are arranged at a fixed distance d2 from the fixed part 401. In this way, it is possible to reduce a difference in a resistance value caused by a difference in contact positions when the movable electrode 402 contacts the fixed electrodes 403a-403h.

An external circuit which processes a dynamic quantity detection signal may be connected to the part of the fixed electrodes 403a-403h, 403k and fixed part electrode 403j which is exposed further to the exterior than the second semiconductor substrate 407 by wire bonding etc. In this way, because the dynamic quantity sensor 400 can detect a change in a resistance value due to application of an external force in a Z direction when the movable electrode 402 contacts with the electrode 409k, it is possible to detect the magnitude of an external force in a Z direction.

According to the dynamic quantity sensor 400 related to the fourth embodiment of the present invention manufactured by the processes described above, it is possible to detect the magnitude, direction and acceleration of a triaxial direction (X direction, Y direction, Z direction) external force. In addition, the dynamic quantity sensor 400 related to the fourth embodiment of the present invention has a simple structure compared to a conventional sensor which uses a piezo resistance element or a capacitance type sensor. Therefore, it is possible to reduce manufacturing processes and thereby manufacturing costs.

Fifth Embodiment

Manufacturing Method of a Dynamic Quantity Sensor

Figure 14:
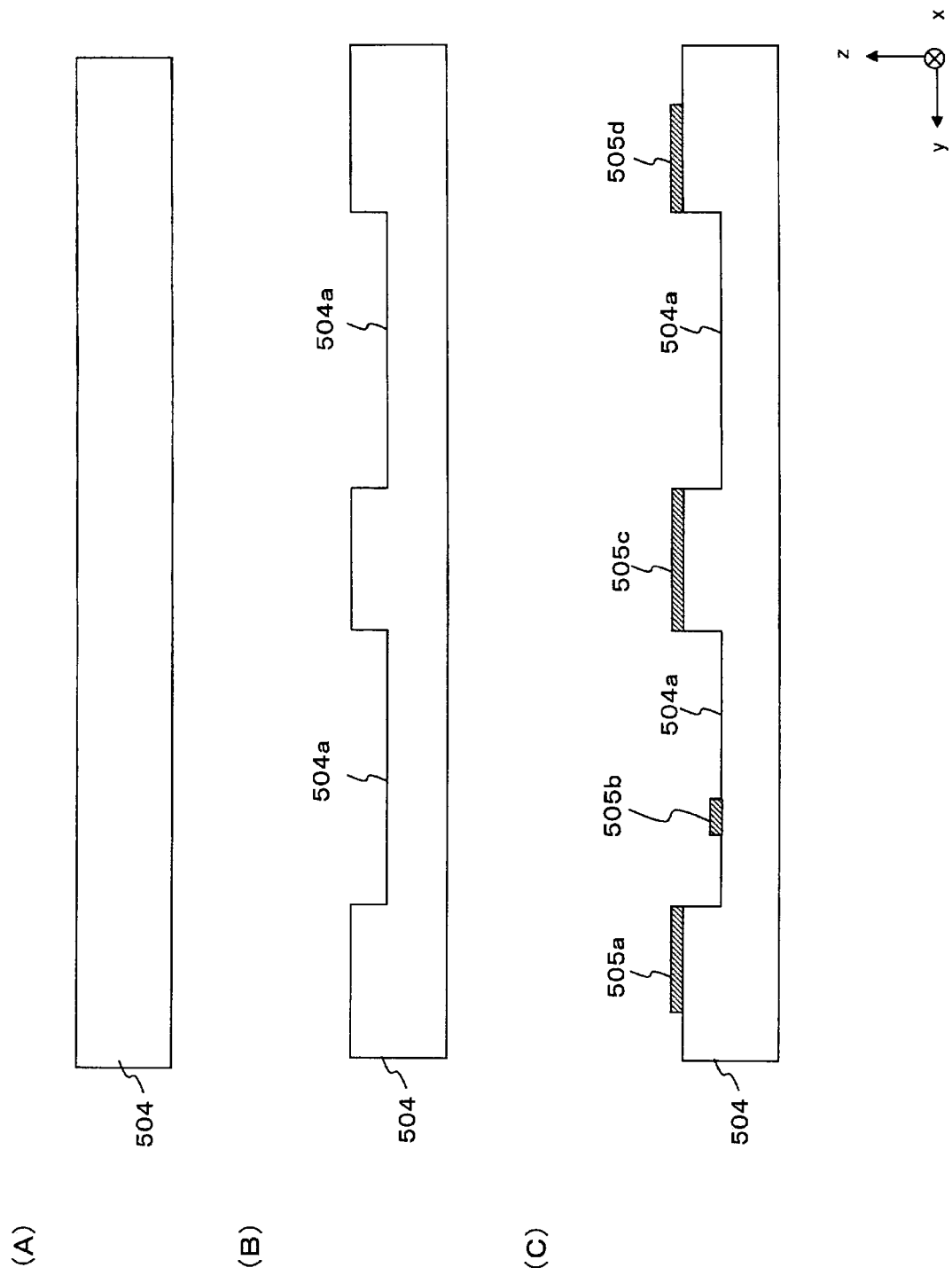
FIG. 14 is a diagram for explaining a manufacturing process of a dynamic quantity sensor related to a fifth embodiment of the present invention and (A) is a cross sectional diagram which shows a semiconductor substrate before processing, (B) is a cross sectional diagram which shows a process for forming a concave part in a glass substrate, and (C) is a cross sectional diagram which shows a process for forming a terminal for a wire on a glass substrate.
Figure 16:
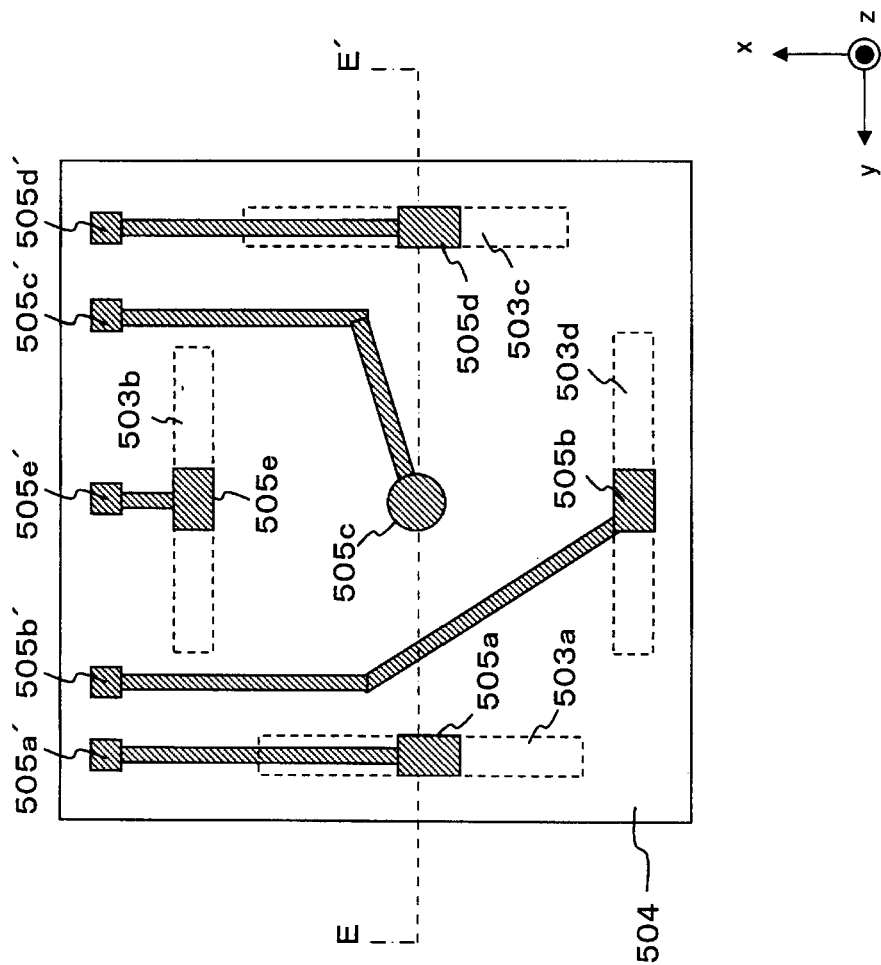
FIG. 16 is a planar diagram which shows an alternative example of a dynamic quantity sensor related to the present invention.

A manufacturing method of a dynamic quantity sensor 500 related to a fifth embodiment of the present invention is further explained below while referring to FIG. 14 to FIG. 16. FIG. 14 (A)-(C) and FIG. 15 (A), (B) are diagrams for explaining the manufacturing processes which show an approximate structure of a cross section of the dynamic quality sensor 500, and FIG. 16 is a planar diagram which shows an approximate structure of a glass substrate 504 of the dynamic quantity sensor 500 seen from above. Furthermore, FIG. 15 (B) shows a cross section of the dynamic quantity sensor 500 seen from the line E-E'.

(1) Forming the Glass Substrate 504 (Refer to FIG. 14 (A), (B))

A glass substrate which includes movable ions (for example, Tempax (registered trademark) Glass) can be used as the glass substrate 504. As is shown in FIG. 14 (B), a concave part 504a is formed on the glass substrate 504 by etching or sandblasting. The concave part 504a is formed corresponding to a formation position of the movable electrode 502 which is formed on the semiconductor substrate 506 which is bonded to the glass substrate 504 in a process described below.

(2) Forming Terminals for Wires 505a-505e, 505a'-505e' (See FIG. 14 (C) and FIG. 16)

Terminals for wires 505a-505e, 505a'-505e' are formed on the surface of the glass substrate 504 on the side formed with the concave part 504a as is shown in see FIG. 14 (C) and FIG. 16. The terminals for wires 505a-505e, 505a'-505e' may be formed by a metal layer in the order Cr layer, Au layer for example, by vapor deposition method or sputter method and removing unnecessary metal layers by etching. The terminals for wires 505a-505e are formed in a position facing the fixed part 501 and the fixed electrodes 503a-503d so that they are electrically connected respectively to the fixed part 501 and the fixed electrodes 503a-503d which are formed on the semiconductor substrate 506 when the glass substrate 504 and the semiconductor substrate 506 are bonded. The terminals for wires 505a'-505e' are connected to the terminals for wires 505a-505e and may be formed near one side end part (upper side of the glass substrate 504 in the diagram) on the surface of the glass substrate on the side formed with the concave part 504a as shown in FIG. 16.

(3) Bonding the Glass Substrate 504 and the Semiconductor Substrate 506 (See FIG. 15 (A))

The glass substrate 504 and the semiconductor substrate 506 are bonded using anode bonding etc. The semiconductor substrate 506 is diffused with impurities so that it contains a desired resistance ratio and may be made to have a low resistance by doping impurities into a Si wafer substrate. As is shown in FIG. 15 (A), the semiconductor substrate 506 is bonded on the surface of the glass substrate 504 on the side on which the terminals for wires 505a-505e, 505a'-505e' are formed.

(4) Processing the Semiconductor Substrate 506 (See FIG. 15 (B))

A mask (not shown in the diagram) for processing the fixed part 501, the movable electrode 502 and the fixed electrodes 503a-503d is formed, and a concave part 506a except the position at which the fixed part 501, the movable electrode 502 and the fixed electrodes 503a-503d are formed, is formed by etching the semiconductor substrate 506 via the mask. In this way, the fixed part 501, the movable electrode 502 and the fixed electrodes 503a-503d which are electrically connected to the terminals for wires 505a-505e are formed on the glass substrate 504. It is possible to use DRIE (Deep Reactive Ion Etching) as the etching method.

According to the dynamic quantity sensor 500 related to the fifth embodiment of the present invention manufactured by the processes described above, it is possible to detect the magnitude of a biaxial direction (X direction, Y direction) external force the same as the dynamic quantity sensors 200, 300 related to the first and third embodiments. In addition, the dynamic quantity sensor related to the fifth embodiment of the present invention has a simple structure compared to a conventional sensor which uses a piezo resistance element or a capacitance type sensor. Therefore, it is possible to reduce manufacturing processes and thereby manufacturing costs.

As explained above, because the dynamic quantity sensors 100-500 related to the first to fifth embodiments of the present invention are formed by a conventional etching method or patterning method using a substrate comprised from 2 or 3 layers, the manufacturing process becomes easy. In this way, manufacturing costs are not increased and it becomes possible to manufacture the dynamic quantity sensors 100-500 at low cost.

Alternative Examples

Next, alternative examples of a dynamic quantity sensor are explained below with reference to FIG. 17-FIG. 21. FIG. 17-FIG. 21 are planar diagrams which show an approximate structure of dynamic quantity sensors 600-1000 related to one embodiment of the present invention.

Figure 17:
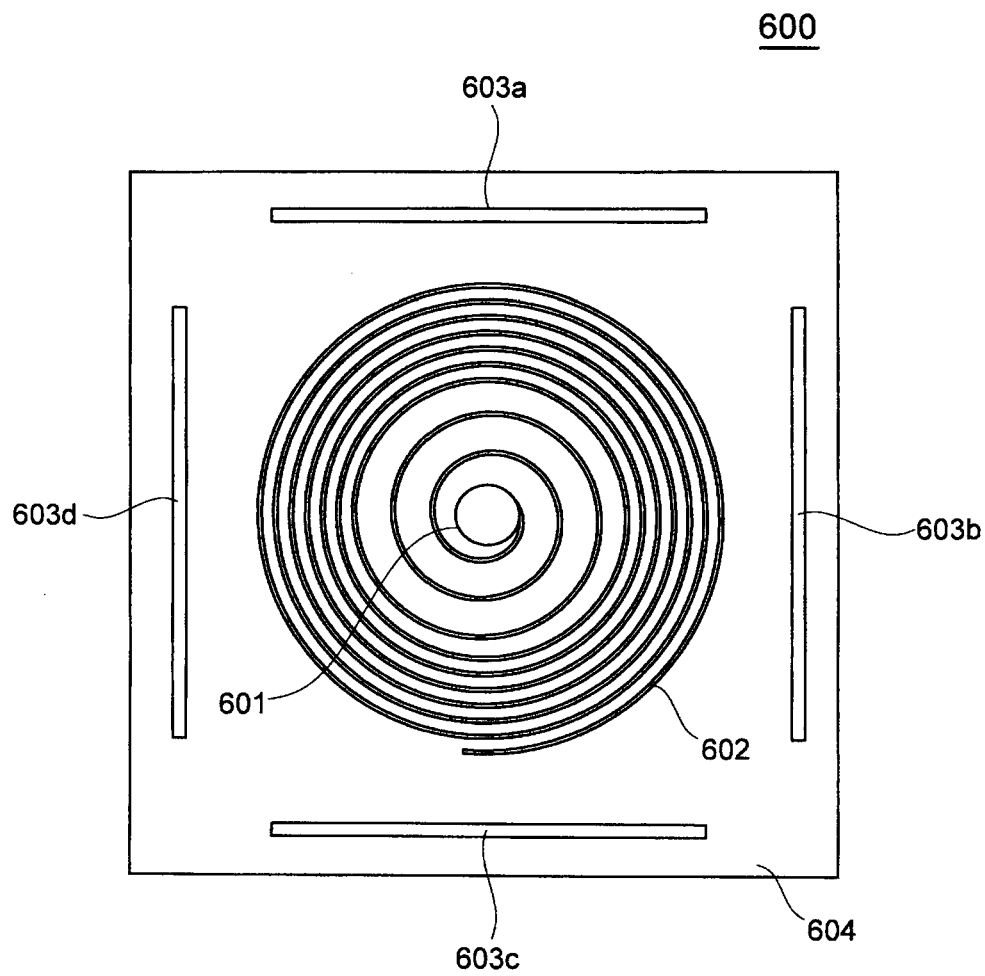
FIG. 17 is a planar diagram which shows an alternative example of a dynamic quantity sensor related to the present invention.

The dynamic quantity sensor 600 may be formed so that the interval of the spiral on the inner periphery side of the movable electrode 602 is wide and the interval of the spiral on the outer periphery side of the movable electrode 602 is narrow as is shown in FIG. 17. In this way, because it is easy for the movable electrode 602 to contact with the fixed electrodes 603a-603d due to the weight of the outer periphery side of the movable electrode 602 when an external force is applied, even in the case when the applied external force is small, a change in the level of resistance can be detected and it is possible to improve detection sensitivity of an external force.

Figure 18:
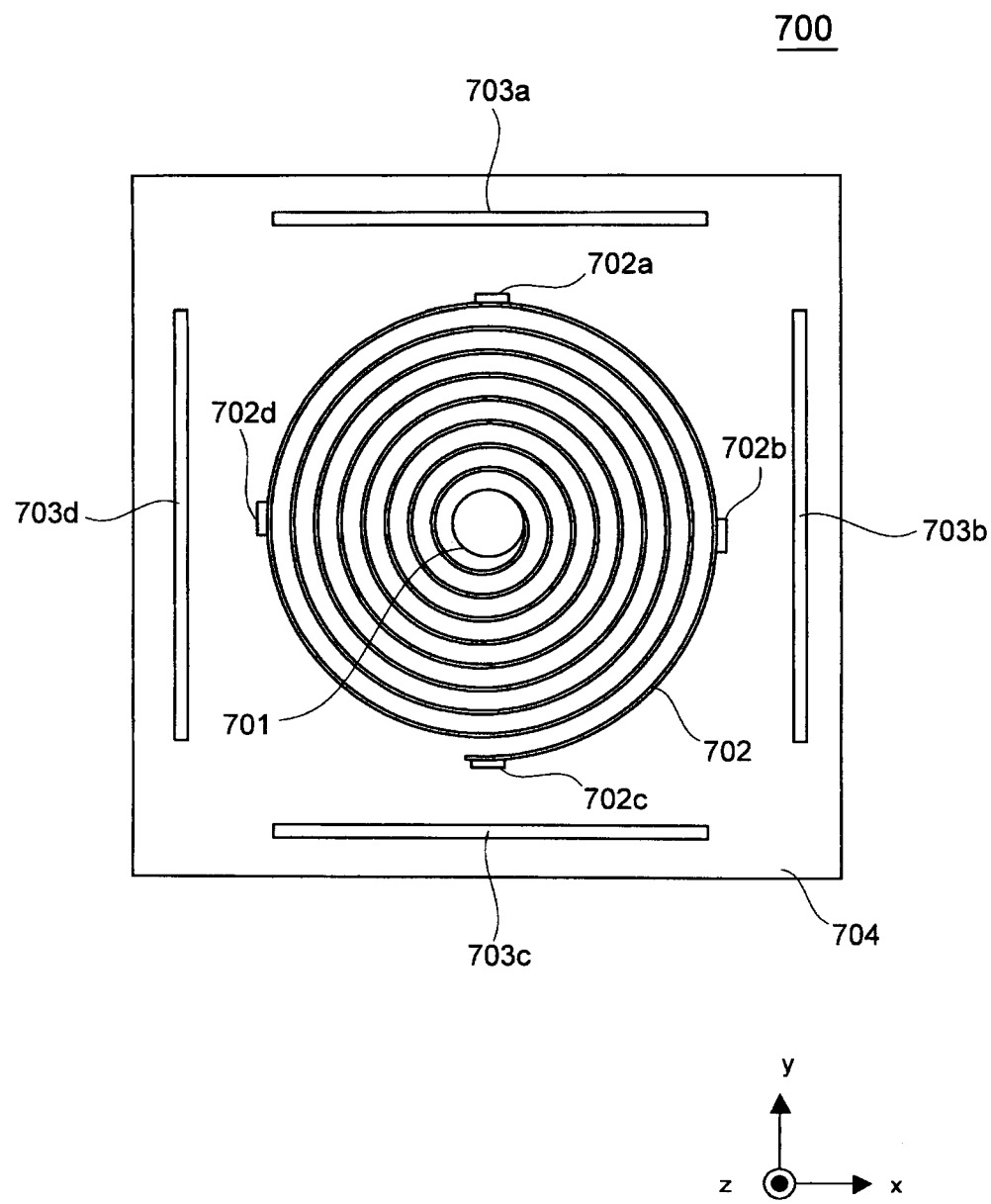
FIG. 18 is a planar diagram which shows an alternative example of a dynamic quantity sensor related to the present invention.

In addition, projection parts 702a-702d may be formed at positions facing the fixed electrodes 703a-703d on the outermost spiral of the dynamic quantity sensor 700 as is shown in FIG. 18. The projection parts 702a-702d are formed as a part of the movable electrode 702 by the same manufacturing process as the manufacturing process of the movable electrode 702 by etching the same semiconductor substrate. It is possible to improve detection sensitivity of an external force by including the projection parts 702a-702d which can contact easily with the fixed electrodes 703a-703d due to the weight which is added to the outer periphery side of the movable electrode 702 when an external force is applied. Furthermore, although the projection parts 702a-702d are shown as rectangular shaped in FIG. 18, they are not limited to this shape. The projection parts 702a-702d may also be circular or triangular shaped. The thickness of the projection parts 702a-702d may also be appropriately changed according to specifications. In addition, the number of projections parts 702a-702d is not limited to the number shown in FIG. 18. The number of projection parts 702a-702d may be appropriately changed according to specifications because it is possible to improve the level of resolution with respect to the orientation of an external force by arranging a plurality of projection parts corresponding to the fixed electrodes 703a-703d.

Figure 19:
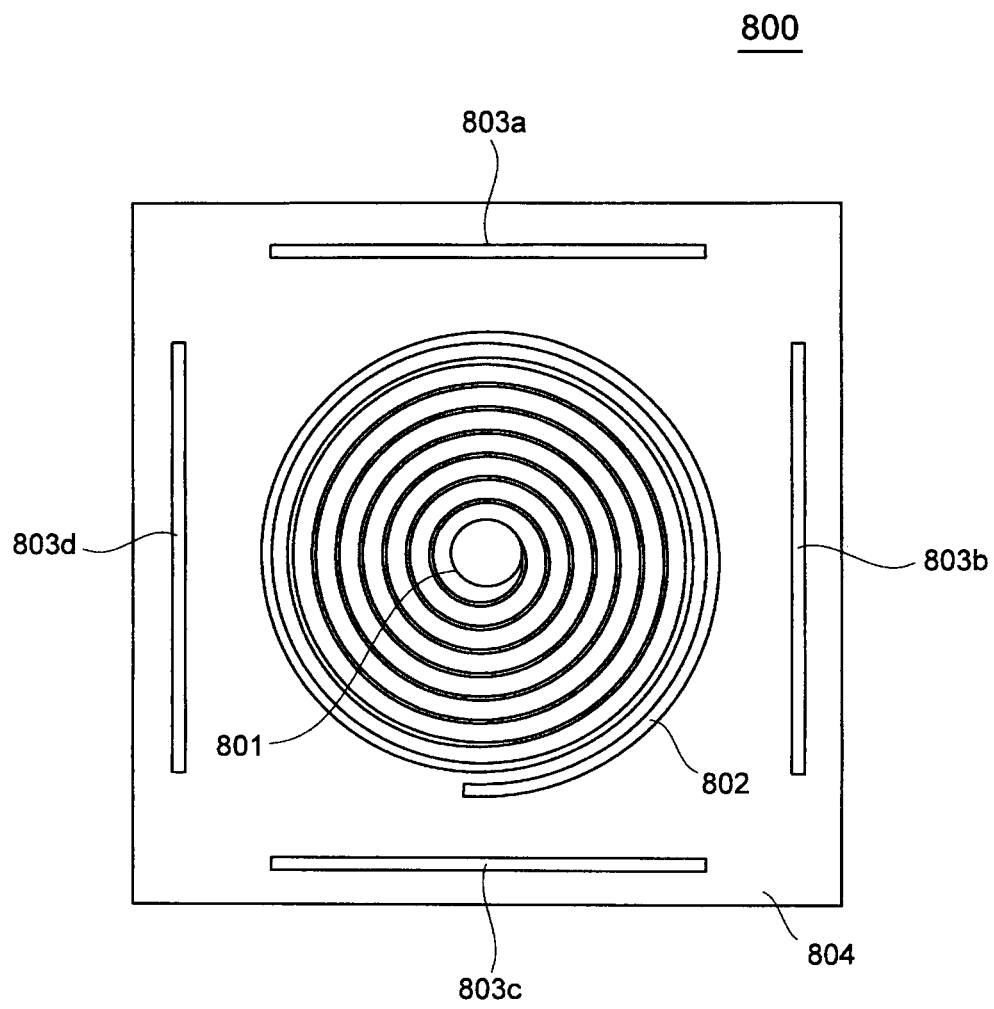
FIG. 19 is a planar diagram which shows an alternative example of a dynamic quantity sensor related to the present invention.

Furthermore, the dynamic quality sensor 800 may be formed so that the width of the movable electrode 802 becomes wider as is winds from the inner periphery towards the outer periphery as is shown in FIG. 19. The movable electrode 802 is formed so that the width becomes gradually wider towards the outer spirals starting from 3 spirals towards to the center of the movable electrode 802 from the outermost spiral, as is shown in FIG. 19. By forming the width of outer periphery spirals of the movable electrode 802 larger, because it is easy for the movable electrode 802 to contact with the fixed electrodes 803a-803d due to the weight of the outer periphery side of the movable electrode 802 when an external force is applied, even in the case when the applied external force is small, a change in the level of resistance can be detected and it is possible to improve detection sensitivity of an external force.

Figure 20:
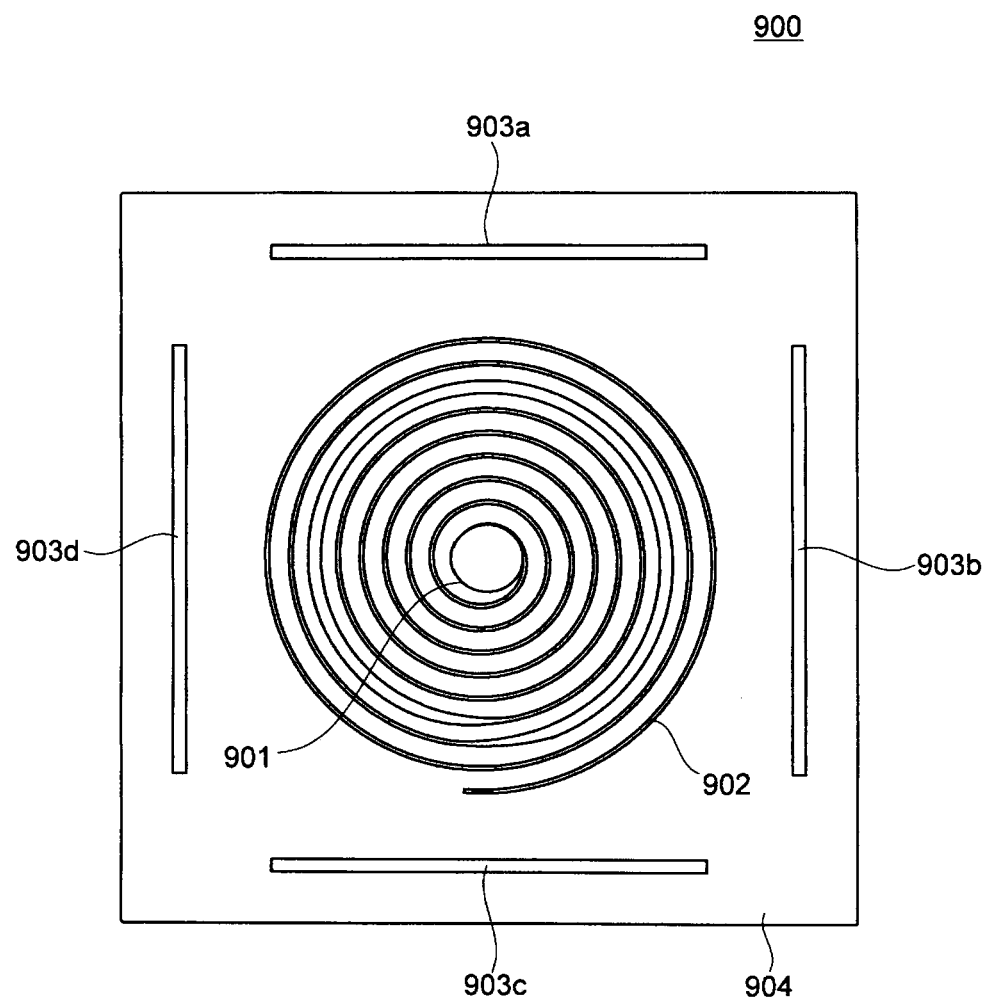
FIG. 20 is a planar diagram which shows an alternative example of a dynamic quantity sensor related to the present invention.

In addition, the dynamic quantity sensor 900 may be formed so that the width of the inner spiral closer to the center than the outermost spiral may be the widest as is shown in FIG. 20. For example, it becomes easier for the movable electrode 902 to contact with the fixed electrodes 903a-903d due to the weight of the part on the inner side of the $3^{rd}$ spiral by forming the width of the part of the $3^{rd}$ inner spiral from the outermost spiral of the movable electrode 902 the widest as is shown in FIG. 20. In this way, even in the case when the applied external force is small, a change in the level of resistance can be detected. In addition, because the part which is would multiple times further to the outer side than the part with the widest width can easily contact with the fixed electrodes 903a-903d, it is possible to increase the magnitude of the change in the level of resistance with respect to an external force. Therefore, it is possible to improve detection sensitivity of an external force. Furthermore, in FIG. 20, a structure of the movable electrode 902 is shown with the part of $3^{rd}$ spiral towards the center from the outermost spiral being the widest. However, the movable electrode 902 is not limited to this shape. The movable electrode 902 may be formed with a plurality of sections having large widths on parts closer to the center than the outermost spiral.

Figure 21:
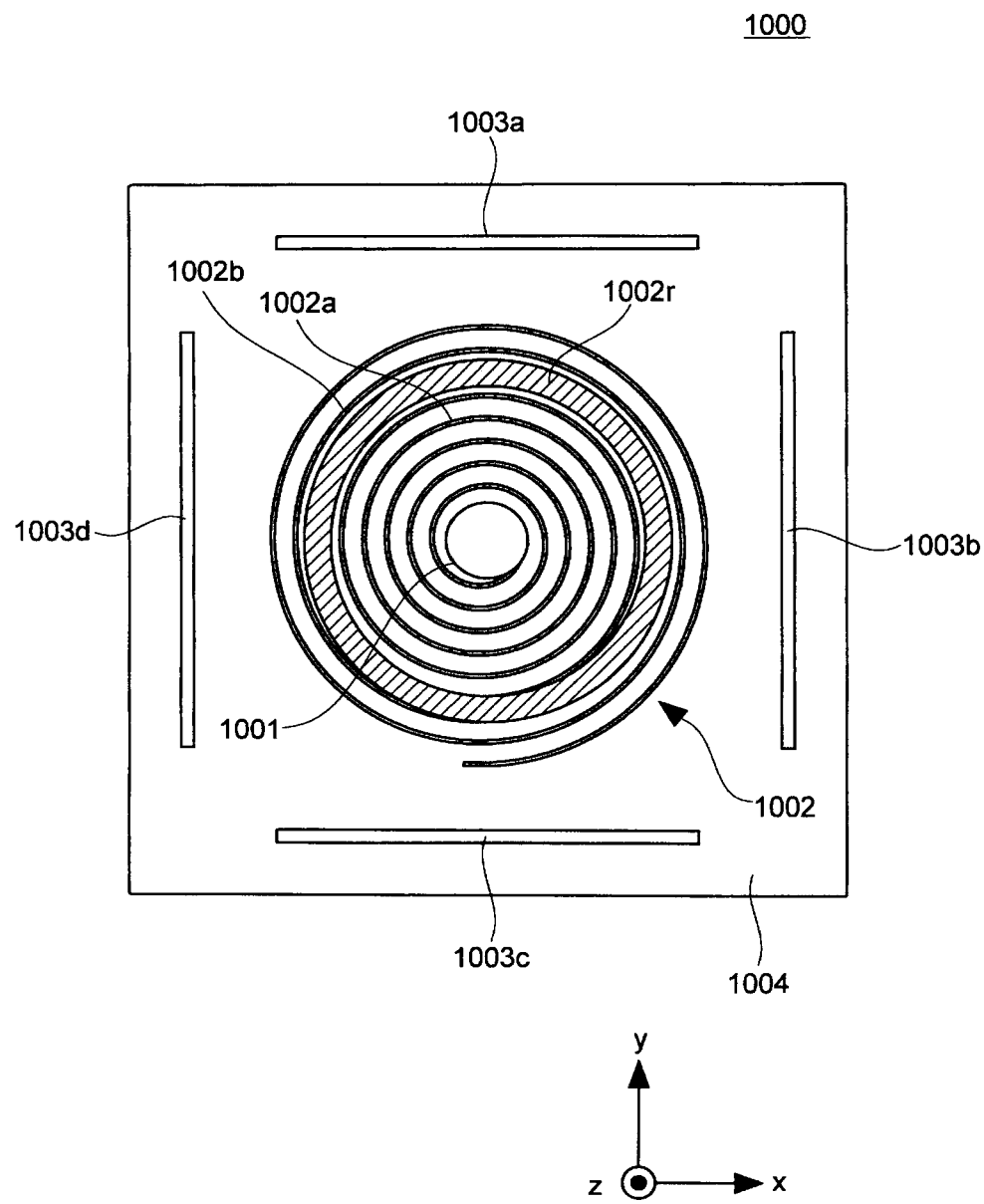
FIG. 21 is a planar diagram which shows an alternative example of a dynamic quantity sensor related to the present invention.

In addition, the dynamic quantity sensor 1000 may be formed with a ring shaped movable electrode 1002r on the inner side of the outmost spiral as is shown in FIG. 21. For example, as is shown in FIG. 21, the movable electrode 1002 includes a first movable electrode 1002a which is connected to the inner periphery surface of the ring shaped movable electrode 1002r, and a second movable electrode 1002b which is connected to the outer periphery of the ring shaped movable electrode 1002r, and the ring shaped movable electrode 1002r which has a thicker width than each width of the first movable electrode 1002a and the second movable electrode 1002b on the inner side of the of the 3rd spiral towards the center from the most outermost spiral. The first movable electrode 1002a, the ring shaped movable electrode 1002r and the second movable electrode 1002b are each arranged separated from a first substrate 1004, and the first movable electrode 1002a and the second movable electrode 1002b are each arranged in a spiral shape on the inner side and outer side of the ring shaped movable electrode 1002r.

The height in a Z direction of the first movable electrode 1002a, the ring shaped movable electrode 1002r and the second movable electrode 1002b may each be 50 μm. The width of the first movable electrode 1002a and the second movable electrode 1002b may be 15 μm for example, and the width of the ring shaped movable electrode 1002r may be 100 μm for example. By making the width of the ring shaped movable electrode 1002r wider than the width of the first movable electrode 1002a and the width of the second movable electrode 1002b, the second movable electrode 1002b arranged on the outer side of the ring shaped movable electrode 1002r contacts easily with the fixed electrodes 1003a-1003d. In addition, the interval between spirals of the first movable electrode 1002a may be set at 50 μm and the interval between spirals of the second movable electrode 1002b may be set at 15 μm. By making the interval of the second movable electrode 1002b arranged on the outer side of the ring shaped movable electrode 1002r narrower than the interval of the first movable electrode 1000b arranged on the inner side, the second movable electrode 1002b easily contacts with the fixed electrodes 1003a-1003d. With this structure, the dynamic quantity sensor 1000 shown in FIG. 21 can detect a change in a resistance value even in the case when the applied external force is small, and it is possible to increase the change in the level of resistance with respect to an external force the same as the dynamic quantity sensor 900 shown in FIG. 20. Therefore, it is possible to improve the level of detection sensitivity of an external force. Furthermore, while a shape including a ring shaped movable electrode 1002r on the inner side of the 3rd spiral towards the center from the outermost spiral is shown in FIG. 21, the shape is not limited to this shape. A plurality of ring shaped movable electrodes 1002r may be formed towards the center from the outermost spiral.

As described above, the detection sensitivity of an external force of the dynamic quantity sensors 600-1000 related to the embodiments of the present invention can be increased by changing the shape of the movable electrodes 602-1002.

Figure 22:
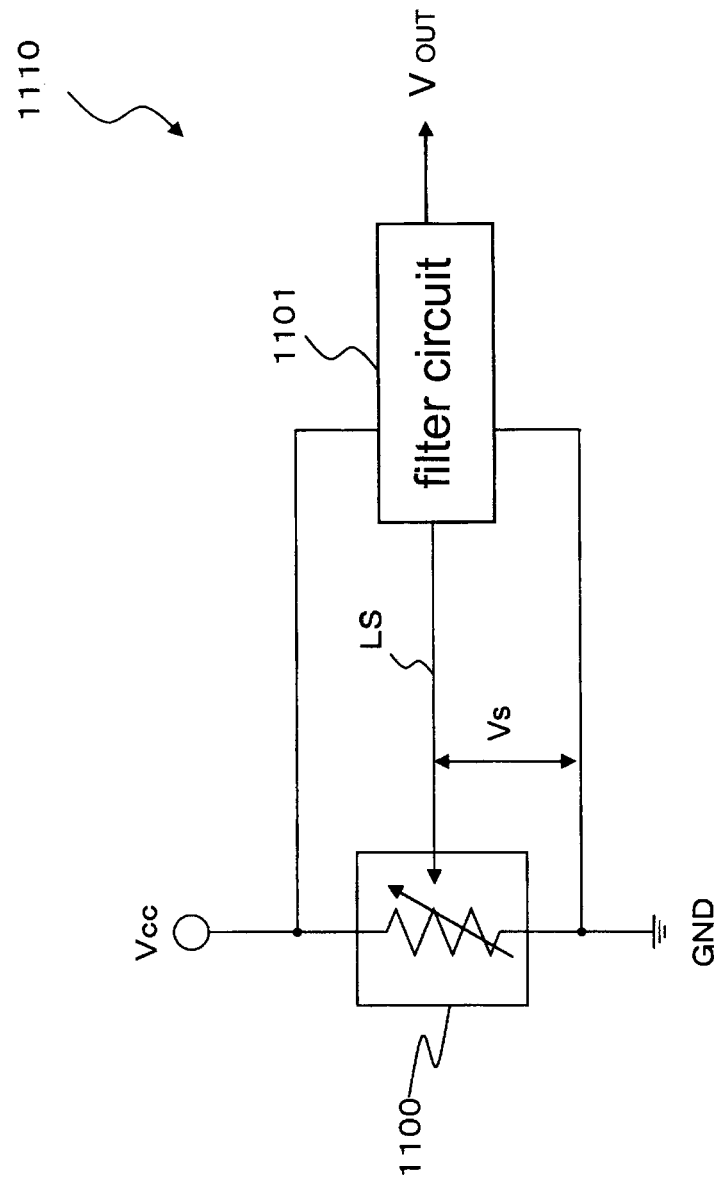
FIG. 22 is a diagram which shows a circuit structure of a process circuit which processes a signal detected by a dynamic quantity sensor related to one embodiment of the present invention.

Next, a structural example of a processing circuit 1110 for processing each dynamic quantity detection signal detected by the dynamic quantity sensors 100-1100 is explained while referring to FIG. 22.

<Processing Circuit>

FIG. 22 is a diagram which shows a circuit structure of a processing circuit 1110. In FIG. 22, the processing circuit 1110 is formed from a filter circuit 1101. The dynamic quantity sensor 1100 is connected to an input stage of the filter circuit 1101.

One end of the dynamic quantity sensor 1100 is connected to a power supply voltage Vcc, and the other end is connected to ground as shown in FIG. 22. The dynamic quantity sensor 1100 is shown as a variable resistor circuit. The filter circuit 1101 is connected to the power source voltage Vcc and GND, and a detection line Ls which detects a variable resistance level of the dynamic quantity sensor 1100 is connected to the input stage.

In the dynamic quantity sensor 1100, a detection voltage Vs between the detection line Ls and GND changes when a resistance level changes according to the magnitude of an applied external force, and a detection signal corresponding to the detection voltage Vs is input to the filter circuit 1101. The filter circuit 1101 removes the noise component from the detection signal and externally outputs the signal as a detection output signal Vout.

Furthermore, the detection signal output from the processing circuit 1110 is a signal in which the voltage level changes according to the magnitude of the applied external force. As a result, a memory prepared in advance correlates and stores the voltage level of the detection signal output from the processing circuit 1110 and the magnitude of the external force and a level which shows the magnitude of an external force corresponding to the detection signal may be output from the memory.

As shown in FIG. 22, the dynamic quantity sensor 1100 related to the embodiments of the present invention does not require the use of an amplifier circuit. Therefore, it is possible to form periphery circuits with a simple structure. In this way, because it is possible to secure space when mounting the dynamic quantity sensor 1100 in an electronic device, it is possible to effectively utilize space. In addition, it is also possible to reduce manufacturing costs of the processing circuit 1110.

The dynamic quantity sensors 100-1100 related to the embodiments of the present invention described above, for example, are mounted on a circuit substrate which is mounted with an active element such as an IC, and by connecting terminals for wires with a known method such as wire bonding, with an electronic circuit substrate or the active element such as an IC, it is possible to provide a dynamic quantity sensor and electronic circuit as one electronic component. This electronic component can be, for example, mounted on a mobile terminal such as a game device or mobile phone and distributed to the market.

What is claimed is:

1. A dynamic quantity sensor comprising:
    a first substrate;
    a fixed part arranged in the first substrate;
    a spiral shaped movable electrode arranged separated from the first substrate, one end of the spiral shaped movable electrode being supported by the fixed part;
    a fixed electrode positioned on the periphery of the movable electrode and arranged in a detection direction of a dynamic quantity; and
    a first terminal electrically connected to the fixed part and a second terminal electrically connected to the fixed electrode,
    wherein the movable electrode changes shape according to an applied external force and contacts one part of the fixed electrode, and a magnitude of the external force is detected based on a change in an electrical resistance value between the fixed part and the fixed electrode when the movable electrode contacts the fixed electrode.

2. The dynamic quantity sensor according to claim 1, wherein the movable electrode is arranged with a projection part on a side surface of an outermost spiral.

3. The dynamic quantity sensor according to claim 1, wherein a width of the movable electrode gradually increases the greater the distance from the fixed part.

4. The dynamic quantity sensor according to claim 1, wherein the width of one part of the movable electrode is greatest towards the center from the outermost spiral.

5. The dynamic quantity sensor according to claim 1, wherein an interval between spirals of the movable electrode gradually becomes narrower the greater the distance from the fixed part.

6. The dynamic quantity sensor according to claim 1, wherein the fixed electrode is arranged in a perpendicular direction or parallel direction with respect to the first substrate and facing the movable electrode.

7. The dynamic quantity sensor according to claim 1, further comprising:
    a second substrate arranged on the fixed part and the fixed electrode;
    wherein
    the second substrate is arranged matching a position of the fixed part and the fixed electrode, and includes an electrode or wire which is electrically connected to the first terminal or second terminal.

8. The dynamic quantity sensor according to claim 1, wherein the fixed electrode is arranged at a fixed distance from the fixed part.

9. A dynamic quantity sensor comprising:
    a first substrate;
    a fixed part arranged in the first substrate;
    a spiral shaped movable electrode arranged separated from the first substrate, one end of the spiral shaped movable electrode being supported by the fixed part;
    a fixed electrode positioned on the periphery of the movable electrode and arranged in a detection direction of a dynamic quantity; and
    a first terminal electrically connected to the fixed part and a second terminal electrically connected to the fixed electrode,
    wherein the movable electrode includes a first movable electrode, a second movable electrode and a ring shaped movable electrode, an end part of the outermost spiral of the first movable electrode is connected to an inner spiral surface of the ring shaped movable electrode, the ring shaped movable electrode is arranged separated from the first substrate on the periphery of the outermost spiral of the first movable electrode, an end part of the innermost spiral of the second movable electrode is connected to an outer periphery surface of the ring shaped movable electrode, the second movable electrode is arranged in a spiral shape separated from the first substrate on an outer periphery of the ring shaped movable electrode, and the width of the ring shaped movable electrode is wider than each width of the first movable electrode and the second movable electrode.

* * * * *